(12) United States Patent
Tengan et al.

(10) Patent No.: US 6,419,606 B1
(45) Date of Patent: Jul. 16, 2002

(54) AIRCRAFT CONTROL SURFACE DRIVE APPARATUS

(75) Inventors: Alfred K. Tengan, Huntington Beach; Da-Yu Hsu, Yorba Linda, both of CA (US)

(73) Assignee: Eaton Corporation, Cleveland, OH (US)

( * ) Notice: Subject to any disclaimer, the term of this patent is extended or adjusted under 35 U.S.C. 154(b) by 147 days.

(21) Appl. No.: 09/640,608

(22) Filed: Aug. 17, 2000

(51) Int. Cl.[7] ............................................... F16H 37/06
(52) U.S. Cl. ................. 475/5; 475/6; 475/254; 475/263; 475/900
(58) Field of Search .................. 475/1, 5, 6, 254, 475/257, 263, 264, 900; 224/228, 231

(56) References Cited

U.S. PATENT DOCUMENTS

| | | | |
|---|---|---|---|
| 4,633,984 A | * | 1/1987 | Hudson ........................ 475/900 |
| 4,663,985 A | * | 5/1987 | Metcalf et al. ................. 475/5 |
| 4,864,882 A | * | 9/1989 | Capewell .................... 74/411.5 |
| 5,071,397 A | * | 12/1991 | Grimm ........................ 475/263 |
| 5,957,798 A | * | 9/1999 | Smith, III et al. ............... 475/5 |

* cited by examiner

Primary Examiner—Sherry Estremsky
(74) Attorney, Agent, or Firm—Tarolli, Sundheim, Covell, Tummino & Szabo L.L.P.

(57) ABSTRACT

A drive assembly is operable to move control surfaces on wings of an aircraft. The drive assembly may include a gear reduction assembly which is driven by a pair of motors. The drive assembly has output members which are connected with the control surfaces on the wings of the aircraft. Torque limiting brake assemblies are operable between an engaged condition in which they are effective to prevent rotation of output members and a disengaged condition in which the brake assemblies are ineffective to prevent rotation of the output members. Actuator assemblies are connected with the torque limiting brake assemblies. The actuator assemblies are operable to effect operation of the torque limiting brake assemblies from a disengaged condition to an engaged condition in response to transmission of predetermined torques through the actuator assemblies to the output members. The drive assembly may also include one or more shock absorbing clutch assemblies which absorb the kinetic energy of the motors when the torque limiting brake assemblies are actuated to the engaged condition preventing rotation of the output members.

32 Claims, 7 Drawing Sheets

AIRCRAFT CONTROL SURFACE DRIVE APPARATUS

BACKGROUND OF THE INVENTION

The present invention relates to a drive apparatus which is operable to move control surfaces on wings of an aircraft.

Known apparatus for effecting movement of control surfaces, such as slats and/or flaps, on the wings of an aircraft, have utilized torque limiter/brakes for the control surface or surfaces on the left wing of the aircraft and another torque limiter/brake for the control surfaces on the right wing of the aircraft. Each of these torque limiter/brakes has been coupled to a central power control unit with a long coupling shaft.

With previous devices which effect movement of control surfaces on the wings of an aircraft, the long coupling shaft is required to absorb the shock load generated from the kinetic energy of the drive train during a sudden torque limiter/brake engagement. This sudden engagement could be caused by a jammed output shaft.

During sudden torque limiter/brake engagement, the driving devices for the long coupling shafts may be damaged due to sudden shock loading. This sudden shock loading may result from the inertia of motors and/or other components of the drive apparatus.

SUMMARY OF THE INVENTION

A drive apparatus constructed in accordance with the present invention is operable to move a first control surface on a first wing of an aircraft and a second control surface on a second wing of the aircraft. The drive apparatus may be connected to the control surfaces by drive shafts. The drive apparatus is operable to interrupt rotation of drive shafts in response to the transmission of torque of a predetermined magnitude.

When the drive apparatus interrupts rotation of the drive shafts, the drive apparatus is effective to absorb kinetic energy in order to limit shock loading on the components of the drive apparatus. The drive apparatus may include a first brake assembly which is connected with a control surface on one wing of the aircraft. In the event of a malfunctioning of the control surface, such as a jamming of the control surface or a drive mechanism connected directly to the control surface, the first brake assembly is operable to an engaged condition to prevent rotation of a drive shaft connected with the first control surface. Similarly, the drive apparatus may include a second brake assembly which is connected with a control surface on a second wing of the aircraft. In the event of a malfunctioning of the control surface on the second wing of the aircraft, the second brake assembly is operable to an engaged condition to prevent rotation of a drive shaft connected with the second control surface.

One or more shock absorbing assemblies may be provided to absorb kinetic energy of components of the drive apparatus upon engagement of the brake assemblies to interrupt rotation of the control surface drive shafts. The shock absorbing assembly or assemblies slip when a predetermined torque is transmitted. The predetermined torque at which a shock absorbing assembly begins to slip is at least as great as the sum of the torques required to effect operation of the torque limiting brake assemblies to their engaged condition.

BRIEF DESCRIPTION OF THE DRAWINGS

The foregoing and other features of the invention will become more apparent upon a consideration of he following description taken in connection with the accompanying drawings wherein.

DESCRIPTION OF SPECIFIC PREFERRED EMBODIMENTS OF THE INVENTION

General Description

Figure 1:
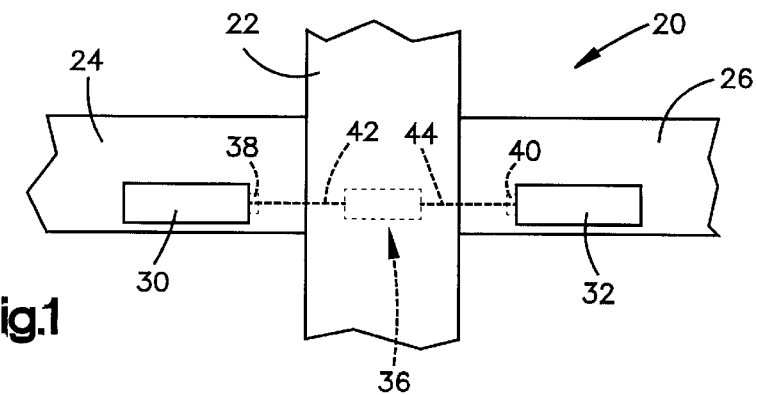
FIG. 1 is a schematic top plan view illustrating the relationship of a drive apparatus, constructed in accordance with the present invention, to control surfaces on wings of an aircraft.

An aircraft 20 (FIG. 1) includes a fuselage 22. A left wing 24 and right wing 26 are connected with the fuselage 20 in a known manner. A left control surface 30 is movable relative to the left wing 24 of the aircraft 20. Similarly, a right control surface 32 is movable relative to the right wing 26 of the aircraft 20.

The control surfaces 30 and 32 may be disposed on flaps, slats, or other known components of an aircraft. Although only a single control surface 30 and 32 has been shown on each of the wings 24 and 26, it is contemplated that a plurality of control surfaces could be provided on each of the wings. The control surfaces 30 and 32 are movable relative to the wings 24 and 26 during flying of the aircraft 20 to vary lift or drag on the wings of the aircraft. Of course, the control surfaces could be provided for other purposes if desired.

A drive apparatus 36, constructed in accordance with the present invention, is operable to effect movement of the control surfaces 30 and 32 relative to the wings 24 and 26 of the aircraft 20. The drive apparatus 36 is connected with control surface drive mechanisms 38 and 40 by shaft assemblies 42 and 44. Each of the shaft assemblies 42 and 44 may be formed by a single shaft or by a plurality of interconnected shafts.

When the drive apparatus 36 is operated, the shaft assemblies 42 and 44 are rotated to transmit torque to the control surface drive mechanisms 38 and 40. The torque transmitted from the drive apparatus 36 through the shaft assemblies 42 and 44 to the control surface drive mechanisms 38 and 40 effects movement of the control surfaces 30 and 32 relative to the wings 24 and 26 of the aircraft 20. The two control surfaces 30 and 32 are moved in synchronism relative to the wings 24 and 26 during normal operation of the drive apparatus 36.

In the unlikely event of an unforeseen malfunction of a control surface 30 or 32 or control surface drive mechanism 38 or 40, the drive apparatus 36 is effective to limit the magnitude of torque transmitted to the control surface drive mechanisms. Thus, when a predetermined torque is transmitted through one of the shaft assemblies 42 or 44 between the drive apparatus 36 and one of the control surface drive mechanisms 38 or 40, the drive apparatus 36 interrupts rotation of the shaft assemblies 42 and 44. As this occurs, the drive apparatus 36 is also effective to absorb shock loading resulting from abrupt interruption of rotation of the shaft assemblies 42 and 44.

Figure 2:
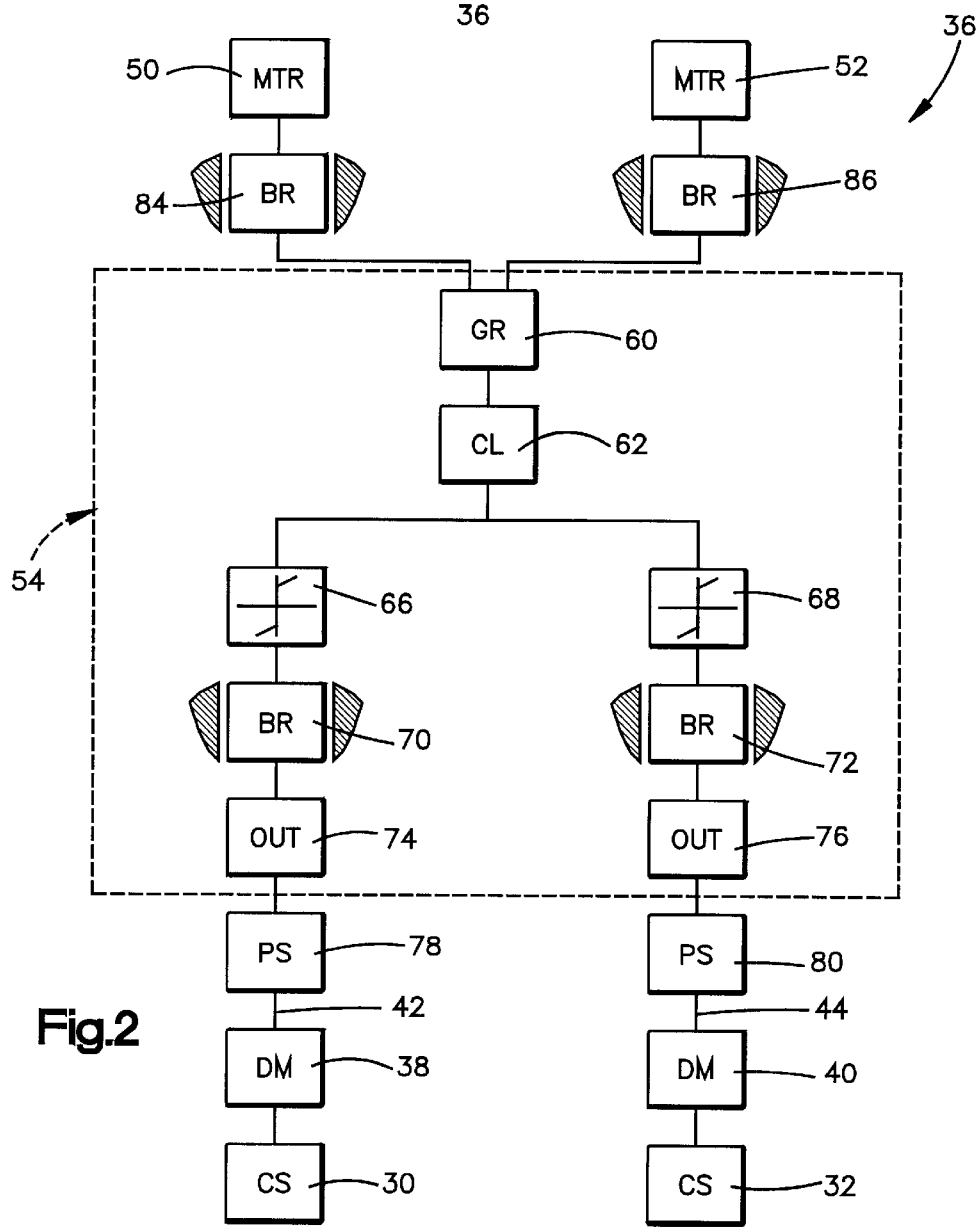
FIG. 2 is a schematic illustration depicting the relationship of components of the drive apparatus of FIG. 1.

The construction of the drive apparatus 36 and the manner in which it is connected with the control surfaces 30 and 32 is illustrated schematically in FIG. 2. The drive apparatus 36 includes a pair of reversible motors 50 and 52. Although it is believed that it may be preferred to use two motors 50 and 52, a single motor could be utilized if desired. The use of a pair of motors 50 and 52 may be preferred since one of the motors will be operative in the event of a malfunction of the other motor.

Upon energization of the motors 50 and 52, a transmission assembly 54 (FIGS. 2 and 3) in the drive apparatus 36 transmits force to the shaft assemblies 42 and 44 (FIGS. 1 and 2). This force is transmitted through the shaft assemblies 42 and 44 to the drive mechanisms 38 and 40 and the control surfaces 30 and 32. Operation of the drive mechanisms 38 and 40 under the influence of the force transmitted from the transmission assembly 54 is effective to move the control surfaces 30 and 32 together through the same distance relative to the wings 24 and 26 (FIG. 1) of the aircraft 20.

The transmission assembly 54 (FIG. 2) includes a gear reduction assembly 60. The gear reduction assembly 60 is connected with a shock absorbing clutch assembly 62. Upon interruption of rotation of the shaft assemblies 42 and 44, the shock absorbing clutch assembly 62 is effective to absorb the kinetic energy of the motors 50 and 52 in order to minimize shock loading of components of the drive apparatus 36.

During normal operation of the drive apparatus 36, force is transmitted from the shock absorbing clutch assembly 62 through a pair of brake actuator assemblies 66 and 68 to torque limiting brake assemblies 70 and 72. Output members 74 and 76 from the transmission assembly 54 are connected with the brake assemblies 70 and 72. The transmission output members 74 and 76 are rotated under the influence of torque transmitted through the brake actuator assemblies 66 and 68 and the torque limiting brake assemblies 70 and 72.

Position sensors 78 and 80 (FIG. 2) are connected with the transmission output members 74 and 76 and the shaft assemblies 42 and 44. The position sensors 78 and 80 sense the rotational position of the transmission output members 74 and 76 and shaft assemblies 42 and 44. Since the shaft assemblies 42 and 44 are connected with the control surfaces 30 and 32 through the drive mechanisms 38 and 40, the output from the position sensors 78 and 80 is indicative of the positions of the control surfaces 30 and 32 relative to the wings 24 and 26 of the aircraft 20.

Motor brakes 84 and 86 may be provided between the motors 50 and 52 and the transmission 54. The motor brakes 84 and 86 are effective to hold the components of the motors 50 and 52 stationary prior to activation of the motors. In addition, the motor brakes 84 and 86 are effective to hold the control surfaces 30 and 32 against movement relative to the wings 24 and 26 when the motors 50 and 52 are in a nonoperating condition.

Immediately prior to activation of the motors 50 and 52, the motor brakes 84 and 86 are released to enable the motors 50 and 52 to drive the transmission assembly 54 and effect movement of the control surfaces 30 and 32. Prior to activation of the motors 50 and 52, the motor brakes 84 and 86 prevent relative movement between components of the transmission assembly 54. Therefore, when the motor brakes 84 and 86 are engaged, the control surfaces 30 and 32 are held against movement relative to the wings 24 and 26 of the aircraft 20.

When the control surfaces 30 and 32 are to be moved relative to the wings 24 and 26 of the aircraft, the motor brakes 84 and 86 are disengaged. The motors 50 and 52 are then simultaneously operated. Force is transmitted from the motors 50 and 52 through the disengaged motor brakes 84 and 86 to the transmission assembly 54. The force is transmitted from the transmission assembly 54 to the shaft assemblies 42 and 44 to effect operation of the drive mechanisms 38 and 40. Operation of the drive mechanisms 38 and 40 moves the control surfaces 30 and 32 relative to the wings 24 and 26 of the aircraft 20.

If for some unforeseen reason a malfunction occurs and one of the control surfaces 30 or 32 cannot move relative to the wing 24 or 26 of the aircraft 20, the transmission assembly 54 is effective to interrupt rotation of the shaft assemblies 42 and 44 and limit the torque transmitted through the shaft assemblies. For example, if the control surface 30 or drive mechanism 38 should become jammed, the torque transmitted through the shaft assembly 42 will increase due to the increased resistance to movement of the control surface. The increase in torque causes the brake actuator assembly 66 to operate the torque limiting brake assembly 70 from a disengaged condition to an engaged condition.

Upon operation of the torque limiting brake assembly 70 to the engaged condition, the torque limiting brake assembly is effective to prevent rotation of the transmission output member 74 and shaft assembly 42. This results in the magnitude in the torque transmitted to the drive mechanism 38 to the shaft assembly being limited to a torque which is substantially equal to the predetermined torque necessary to effect operation of the brake actuator assembly 66. Contemporaneously with operation of the torque limiting brake assembly 70 to interrupt rotation of the shaft assembly 42, rotation of the shaft assembly 44 is interrupted.

Similarly, operation of the torque limiting brake assembly 72 from the disengaged condition to the engaged condition interrupts rotation of the transmission output member 76 and shaft assembly 44. At the same time, rotation of the transmission output member 74 and shaft assembly 42 is interrupted. Of course, this interrupts movement of the control surfaces 30 and 32 relative to the wings 24 and 26.

Operation of either of the torque limiting brake assemblies 70 and 72 to the engaged condition stops the transmission of torque from the motors 50 and 52 through the transmission assembly 54. Stopping the transmission of torque through the transmission assembly 54 is effective to stop operation of the motors 50 and 52. As this occurs, kinetic energy stored in the motors 50 and 52 and other components of the drive apparatus 36 must be dissipated. In order to minimize shock loading on components of the drive apparatus 36, the kinetic energy in the motors 50 and 52 is dissipated by slipping of the shock absorbing clutch assembly 62.

The torque required to effect slipping of the shock absorbing clutch assembly 62 is greater than the sum of the torques required to effect operation of the brake actuator assemblies 66 and 68 to effect operation of the torque limiting brake assemblies 70 and 72 to the engaged condition. Therefore, the shock absorbing clutch assembly 62 does not slip prior to operation of one of the torque limiting brake assemblies 70 and 72 to the engaged condition. This enables sufficient torque to be transmitted from the motors 50 and 52 through the transmission assembly 54 to move the control surfaces 30 and 32 against normal loads imposed by flow of air around the wings 24 and 26 of the aircraft 20.

It is contemplated that the brake actuator assemblies 66 and 68 may effect operation of the torque limiting brake assemblies 70 and 72 from the disengaged condition to the engaged condition in response to many different magnitudes of torque. In one specific embodiment of the invention, the brake actuator assembly 66 or 68 effected operation of the associated torque limiting brake assembly 770 or 72 to the engaged condition in response to the transmission of a torque of 300 Newton meters through the one brake actuator assembly 66 or 68. In this specific embodiment of the invention, the shock absorbing clutch assembly 62 is adjusted so as to begin slipping in response to transmission of 700 Newton meters or more of torque through the shock absorbing clutch assembly.

Of course, the specific torque values at which the brake actuator assemblies 66 and 68 effect operation of the torque limiting brake assemblies 70 and 72 to the engaged condition will depend upon the construction of the aircraft 20 in which the drive apparatus 36 is disposed. Similarly, the specific value of the torque at which the shock absorbing clutch assembly 62 begins to slip will vary as a function of the construction of the aircraft 20. It should be understood that the foregoing specific numerical values for these predetermined torques have been set forth herein for purposes clarity of description and it is contemplated that the drive apparatus 36 will be constructed so as to respond to many different torques depending upon the particular environment in which the drive apparatus is utilized.

To operate an engaged one of the torque limiting brake assemblies 70 and 72 from the engaged condition to the disengaged condition, the direction of operation of the motors 50 and 52 is reversed. This reverses the direction of the torque load applied to the brake actuator assemblies 66 and 68. Reversing the torque load transmitted to the brake actuator assemblies 66 and 68 reverses the operation of the brake actuator assemblies and results in the engaged one of the torque limiting brake assemblies 70 and 72 being operated from the engaged condition to the disengaged condition.

Gear Reduction Assembly

Figure 3:
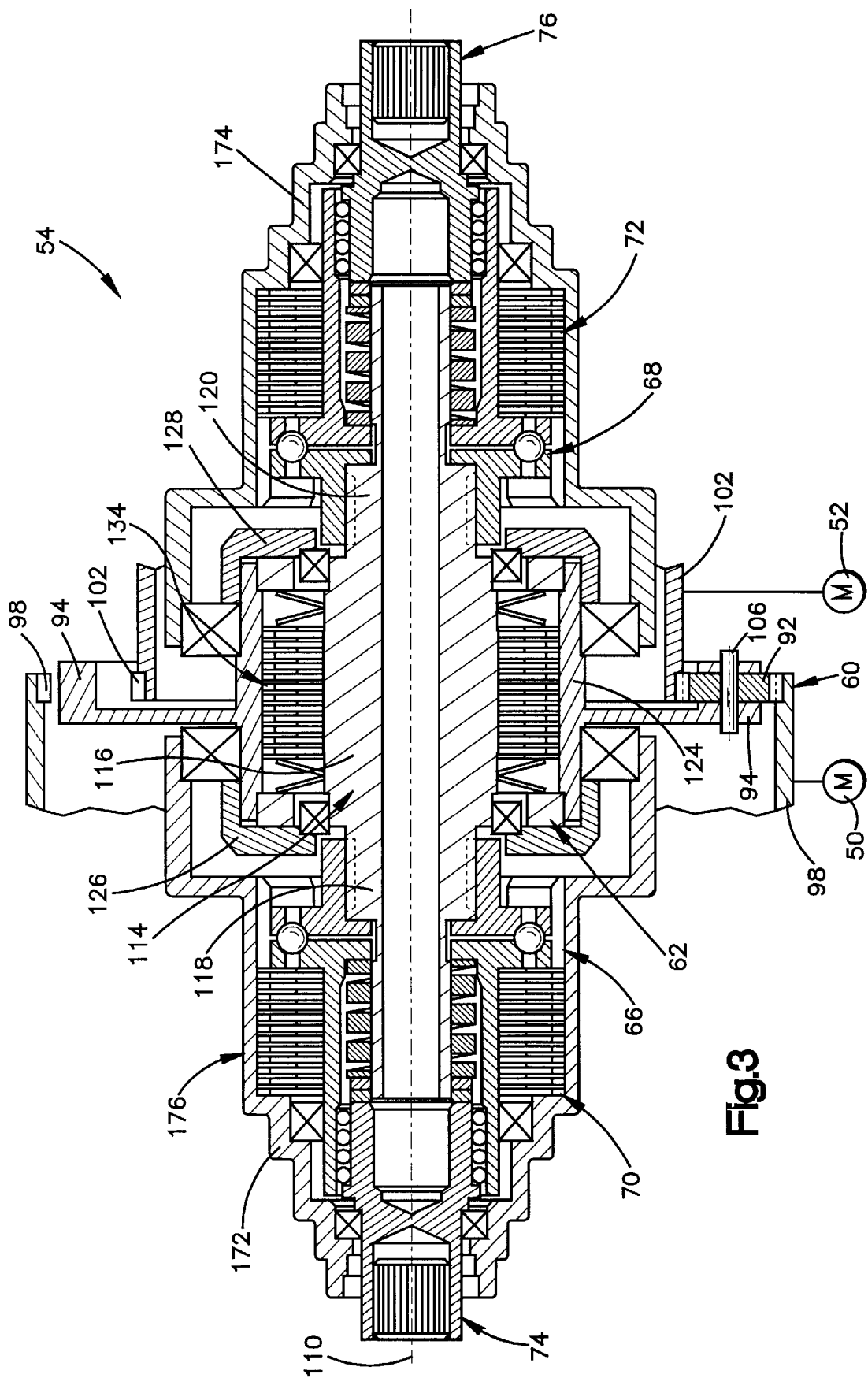
FIG. 3 is a sectional view of a transmission assembly containing components of the drive assembly of FIGS. 1 and 2.

One specific embodiment of the transmission assembly 54 is illustrated in FIG. 3. Force is transmitted from the motors 50 and 52 to the gear reduction assembly 60 in the transmission assembly 54. Force is transmitted from the gear reduction assembly 60 to the shock absorbing clutch assembly 62.

Force is transmitted from the shock absorbing clutch assembly 62 to both of the brake actuator assemblies 66 and 68. Force is transmitted through the brake actuator assemblies 66 and 68 to torque limiting brake assemblies 70 and 72. The force is transmitted through the torque limiting brake assemblies 70 and 72 to transmission output members 74 and 76. The transmission output members 74 and 76 are connected with the control surface drive mechanisms 38 and 40 through position sensor assemblies 78 and 80 and shaft assemblies 42 and 44 in the manner illustrated schematically in FIG. 2.

Torque is transmitted from the two motors 50 and 52 (FIG. 3) to the gear reduction assembly 60 in the transmission assembly 54. The gear reduction assembly 60 may have a construction corresponding to the construction of any one of many different known gear reduction assemblies. One specific gear reduction assembly 60 includes a planet gear 92 which is rotatably supported on a planet carrier 94. The motor 50 is drivingly connected with a ring gear 98 which is disposed in meshing engagement with the planet gear 92. The motor 52 is drivingly connected with a sun gear 102 which is disposed in meshing engagement with planet gear 92.

Upon simultaneous operation of the motors 50 and 52, the ring gear 98 is rotated in one direction, for example, clockwise, by the motor 50. At the same time, the sun gear 102 is rotated in the opposite direction, for example counterclockwise, by the motor 52. Meshing engagement of the ring and sun gears 98 and 102 with the planet gear 92 results in rotation of the planet gear about a mounting shaft 106 which is fixedly connected with the planet carrier 94. Rotation of the planet gear 92 causes the planet carrier 94 and planet gear to revolve or rotate together about a central axis 110 of the transmission assembly 54. The ring gear 98, sun gear 102, and planet carrier 94 all rotate about the central axis 110 of the transmission assembly 54.

If, for some unforeseen reason, one of the motors 50 or 52 should malfunction, the other motor would be effective to drive the gear reduction assembly 60. Thus, under normal conditions, both motors 50 and 52 are operated at the same speed to rotate the ring gear 98 and sun gear 102 at the same speed and in opposite directions about the central axis 110 of the transmission assembly 54. However, if one of the motors, for example, the motor 50, should malfunction, the other motor, that is, the motor 52, would rotate the sun gear and cause the planet gear 92 to rotate about the mounting shaft 106. As this occurs, the ring gear 98 would remain stationary and the planet carrier 94 would rotate about the central axis 110 of the transmission assembly 54 at one-half of its normal speed of rotation.

Although the gear reduction assembly 60 illustrated in FIG. 3 is one specific known epicyclic gear train, other known gear trains could be utilized. The gears utilized in the gear reduction assembly 60 could be helical, bevel, spur or any other known type of gear.

Shock Absorbing Clutch Assembly

Force is transmitted from the planet carrier 94 (FIG. 3) through the shock absorbing clutch assembly 62 to an intermediate drive member or shaft 114. The shock absorbing clutch assembly 62 is connected to a central portion 116 of the intermediate drive member 114. Opposite end portions 118 and 120 of the intermediate drive member 114 are connected with the brake actuator assemblies 66 and 68.

Figure 4:
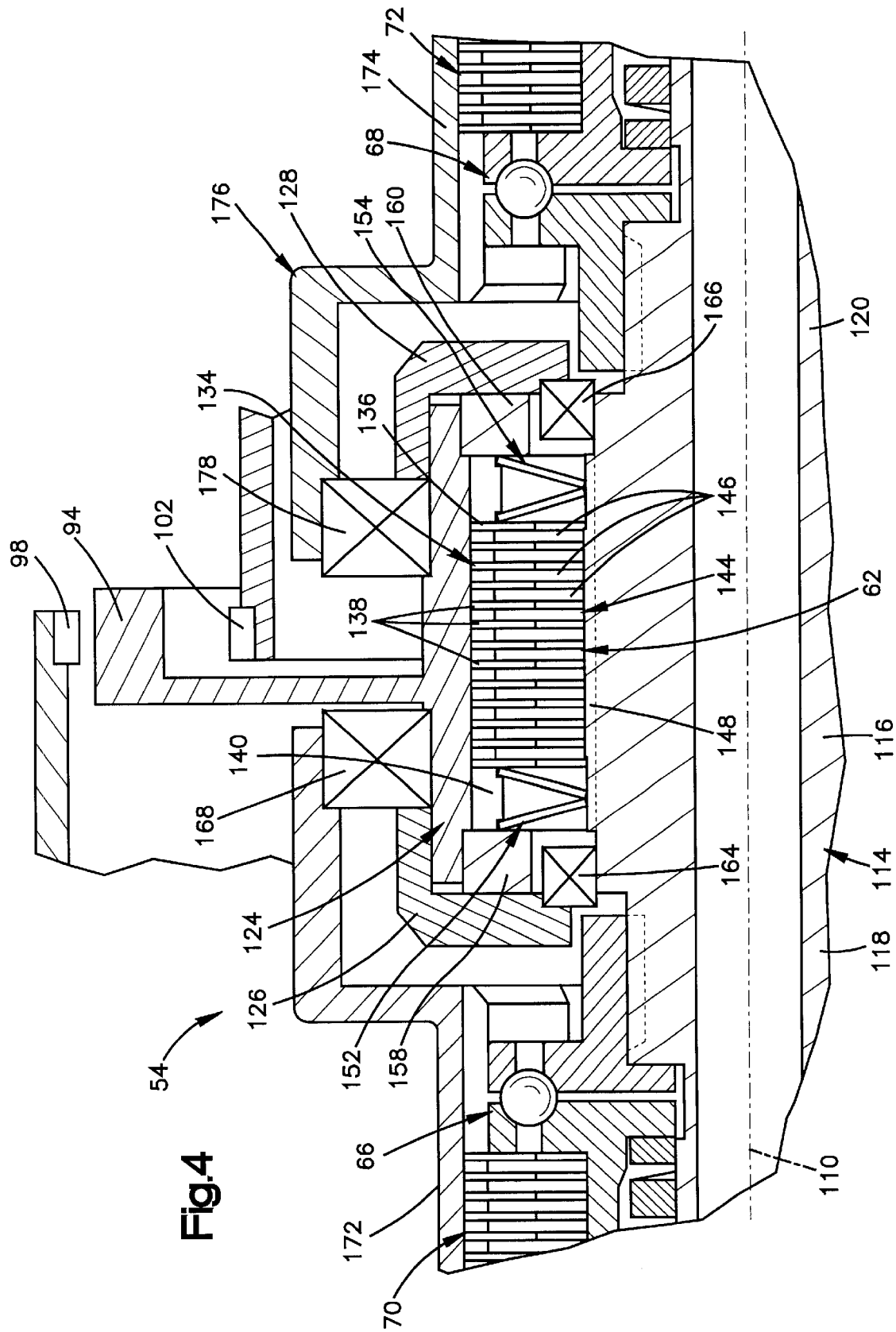
FIG. 4 is an enlarged fragmentary view of a portion of FIG. 3 and illustrating a shock absorbing clutch assembly which forms part of the transmission assembly of FIG. 3.

The construction of the shock absorbing clutch assembly 62 is illustrated in FIG. 4. However, the shock absorbing clutch assembly 62 could have a construction which is different than the construction illustrated in FIG. 4. The shock absorbing clutch assembly 62 includes a cylindrical clutch input member 124 which is fixedly connected with the planet carrier 94. A pair of annular end caps 126 and 128 have internal thread convolutions which engage external thread convolutions on the clutch input member 124. The clutch input member 124 and end caps 126 and 128 enclose an annular disc pack 134.

The disc pack 134 includes a series 136 of annular input friction discs 138. The friction discs 138 engage linear splines 140 which extend axially along the inside of the clutch input member 124. During operation of the motors 50 and 52 (FIG. 3), the input friction discs 138 (FIG. 4) rotate with the planet carrier 94 and clutch input member 124 about the longitudinal central axis 110 of the transmission assembly 54.

In addition to the series 136 of input friction discs 138, the disc pack 134 includes a series 144 of annular output friction discs 146. The input friction discs 138 are interleaved with the output friction discs 146. The input friction discs 138 have flat annular side surfaces which are disposed in abutting engagement with flat annular side surfaces on the output friction discs 146.

The output friction discs 146 are connected with linear axially extending splines 148 disposed on the central portion 116 of the intermediate drive member 114. The splines 148 on the intermediate drive member 114 extend parallel to the longitudinal central axis 110 of the transmission assembly 54 and to longitudinal axes of the splines 140 on the clutch input member 124.

Springs 152 and 154 are provided at axially opposite ends of the disc pack 134 to press the friction discs 138 and 146 firmly against each other. In the illustrated embodiment of the invention, the springs 152 and 154 are annular disc washers of the "Belleville" (trademark) type. However, the springs 152 and 154 may have a different construction if desired.

The springs 152 and 154 (FIG. 4) are engaged by annular retainer rings 158 and 160. The retainer rings 158 and 160 are held against rotation by the splines 140 on the clutch input member 124. The end caps 126 and 128 press the retainer rings 158 and 160 firmly against the springs 152 and 154 with a predetermined force to preload the disc pack 134. Thus, the springs 152 and 154 are effective to press the discs 138 and 146 firmly against each other with a predetermined preload force.

The annular washer-type springs 152 and 154 are rotatable relative to both the intermediate drive member 114 and the clutch input member 124. The end caps 126 and 128 and clutch input member 124 are supported for rotation about the longitudinal central axis 110 of the intermediate drive member 114 by a pair of annular bearings 164 and 166. Annular bearings 168 and 170 extend between sections 172 and 174 of a housing 176 (FIG. 3). The housing sections 172 and 174 are fixedly connected with the structure of the aircraft and provide a stationary base for supporting the transmission assembly 54.

During operation of the motors 50 and 52 (FIG. 3) the ring gear 98 is rotated in one direction about the axis 110 of the transmission assembly 54 and the sun gear 102 is rotated in the opposite direction about the axis 110. This results in the planet gear 92 rotating about the axis of the mounting shaft 106. As the planet gear 92 rotates about the mounting shaft 106, the planet gear also rotates about the axis 110.

As the planet gear 92 rotates about the axis 110, the planet carrier 94 and clutch input member 124 are rotated relative to the stationary housing 176 about the axis 110. As the clutch input member 124 rotates about the axis 110 with the planet carrier 94, the disc pack 134 transmits force to the central portion 116 of the intermediate drive member or shaft 114 to rotate the intermediate drive member about the axis 110 with the clutch input member 124. This torque is transmitted through the brake actuator assemblies 66 and 68 and torque limiting brake assemblies 70 and 72 (FIG. 3) to the shaft assemblies 42 and 44 (FIG. 1) in the manner previously described.

In the unlikely event of an unforeseen malfunctioning of one of the control surfaces 30 and 32, one of the brake actuator assemblies 66 or 68 will effect operation of one of the torque limiting brake assemblies 70 and 72 (FIG. 3) to interrupt the rotation of the shaft assemblies 42 and 44. When this occurs, the motors 50 and 52 are still operating and the movable components of the motors have a substantial amount of kinetic energy. This kinetic energy is absorbed by slippage, that is relative movement, between the input friction discs 138 and the output friction discs 146 in the disc pack 134.

When one of the torque limiting brake assemblies 70 or 72 (FIG. 3) is operated to the engaged condition, rotation of the intermediate drive member 114 about the axis 110 relative to the housing 176 is suddenly interrupted. At the same time, the movable components in the motors 50 and 52 continue to move and rotate the ring and sun gears 98 and 102. The torque transmitted to the clutch input member 124 from the planet carrier 94 (FIG. 4) results in the input friction discs 138 continuing to rotate about the axis 110 while the output friction discs 146 are stationary relative to the axis 110. The resulting slippage between the friction discs 138 and 146 is effective to dissipate the kinetic energy of the components of the motors 50 and 52 and components of the transmission assembly 54 without excessive shock loading of any of the components of the drive apparatus 36 (FIGS. 1 and 2).

The shock absorbing clutch assembly 62 (FIG. 4) is set to slip when a predetermined torque is applied to the clutch assembly. The predetermined torque at which he shock absorbing clutch assembly 62 begins to slip is large enough to enable torque loading encountered during normal movement of the control surfaces 30 and 32 to be transmitted through the shock absorbing clutch assembly without slippage. The amount of torque required to effect slippage in the shock absorbing clutch assembly 62 with a resulting relative movement between the input friction disc 138 and output friction disc 146 is determined by the preload applied against the disc pack 134 by the springs 152 and 154. The springs 152 and 154 (FIG. 4) are pressed against the disc pack 134 so that the disc pack is effective to transmit normal operating torques to effect movement of the control surfaces 30 and 31 (FIG. 1) on the wings 24 and 26 of the aircraft 20. The springs 152 and 154 (FIG. 4) are effective to preload the disc pack 134 with sufficient force so that slippage, that is, relative movement, begins to occur between the input friction discs 138 and output friction discs 146 when the magnitude of the torque being transmitted through the shock absorbing clutch assembly 62 is greater than the sum of the torques required to effect operation of the brake actuator assemblies 66 and 68 to engage the torque limiting brake assemblies 70 and 72.

In one specific embodiment of the invention, the springs 152 and 154 were effective to preload the disc pack 134 so that the shock absorbing clutch assembly 62 could transmit up to 700 Newton meters of torque without slippage. Of course, the springs 152 and 154 could preload the disc pack 134 so that slippage, that is, relative movement between the input friction discs 138 and output friction discs 146, would occur at either a greater torque load or a lesser torque load.

In the specific embodiment of the drive apparatus 36 illustrated in FIGS. 2 and 3, the motors 50 and 52 are reversible hydraulic motors. Thus, the motors 50 and 52 are operated in either one of two directions under the influence of hydraulic fluid pressure. Valves for controlling flow of hydraulic fluid to the motors 50 and 52 may be operated to a closed condition in response to detection of a malfunction of the control surfaces 30 and 32 and/or control surface drive mechanisms 38 and 40. However, rotatable components of the motors 50 and 52 will have a substantial amount of kinetic energy which is dissipated by slippage in the shock absorbing clutch assembly 62. By absorbing the kinetic energy of the motors 50 and 52, the shock absorbing clutch assembly 62 prevents excessive shock loading of components of the drive apparatus 36 and shaft assemblies 42 and 44 (FIG. 1).

In the illustrated embodiment of the invention, the motors 50 and 52 are reversible hydraulic motors. However, other known motors could be utilized if desired. For example, the motors 50 and 52 could be electric motors.

In the embodiment of the invention illustrated in FIG. 4, the shock absorbing clutch assembly includes a relatively large number of friction surfaces disposed on a relatively large number of interleaved friction discs 138 and 146. It is contemplated that the shock absorbing clutch assembly 62 could have a different construction if desired. For example, a single friction surface connected with the clutch input member 124 could be disposed in engagement with a single friction surface connected with the intermediate drive member 114. When a predetermined torque load is transmitted through this embodiment of the shock absorbing clutch assembly 62, the friction surfaces would slip or move relative to each other. However, the preload force applied against the friction surfaces would be greater than the preload force applied against the disc pack 134 by the springs 152 and 154. If desired, the force urging the friction surfaces together could increase as the extent of slippage between the friction surfaces increased.

Alternatively, it is contemplated that an annular ring could be connected with the central portion 116 of the intermediate drive member 114. This annular ring could be provided with a pair of friction surfaces formed as frustums of right circular cones having central axes coincident with the axis 110. The friction surface on the left side of the annular ring would taper toward the left, that is, toward the torque limiting brake assembly 70. Similar, the friction surface on the right side of the annular ring would taper toward the right, that is toward the torque limiting brake assembly 72.

In this alternative embodiment of the shock absorbing clutch assembly 62, a pair of annular spring elements could be connected to the clutch input member 124 for rotation with the clutch input member. Each of the spring elements could be formed from a disc having a plurality of slots separated by resiliently deflectable sections interconnecting a radially inner portion and a radially outer portion of the spring discs. In addition, one or more slots could be provided in a radially inner portion of the spring discs to enable the radially inner portion of the spring disc to circumferentially expand under the influence of force applied against the spring disc.

In this alternative embodiment of the shock absorbing clutch assembly, frustoconical surfaces on the two resilient spring discs may be pressed against the friction surfaces which are fixedly connected with the intermediate drive member 114 by actuators which have a cam or wedging action. These actuators could be formed by a plurality of balls disposed between a base member which is held against axial movement relative to the intermediate drive member and a movable member which is movable axially relative to the intermediate drive member. Upon relative rotation between the clutch input member 124 and the intermediate drive member 114, the wedging action provided by the balls would move the movable member axially along the intermediate drive member toward the spring members. This would press the friction surfaces on the spring members against the friction surfaces on the ring connected with the intermediate drive member with a force which increases as the extent of slippage or relative rotation between the clutch input member 124 and intermediate drive member 114 increases.

In the embodiment of the invention illustrated in FIG. 4, the springs 152 and 154 are effective to apply a constant preload force against the disc pack 134. However, it is contemplated that the force applied against the disc pack 134 by the springs 152 and 154 could increase as slippage between the clutch input member 124 and intermediate drive member 114 increases. This increasing spring force could result from having wedge surfaces or cam surfaces disposed adjacent to axially opposite ends of the disc pack 134 move force transmitting members axially toward the springs 152 and 154 to increase the extent of compression of the springs as relative movement occurs between the input friction discs 138 and output friction discs 146.

Brake Actuator Assembly

The torque transmitted from the clutch input member 124 through the disc pack 134 to the intermediate drive member 114 is transmitted from the intermediate drive member to the brake actuator assemblies 66 and 68. The brake actuator assemblies 66 and 68 have the same construction. The brake actuator assembly 68 is connected with the right (as viewed in FIGS. 3 and 5) end portion 120 of the intermediate drive member 114.

When torque transmitted from the end portion 120 of the intermediate drive member 114 to the brake actuator assembly 68 exceeds a predetermined torque, the brake actuator assembly is operated to effect operation of the torque limiting brake assembly 72 from a disengaged condition to an engaged condition. Operation of the torque limiting brake assembly 72 to the engaged condition interrupts rotation of the intermediate drive member 114 about the axis 110. Of course, this interrupts rotation of the output friction discs 146 FIG. 4) and may initiate slippage of the shock absorbing clutch assembly 62.

Figure 5:
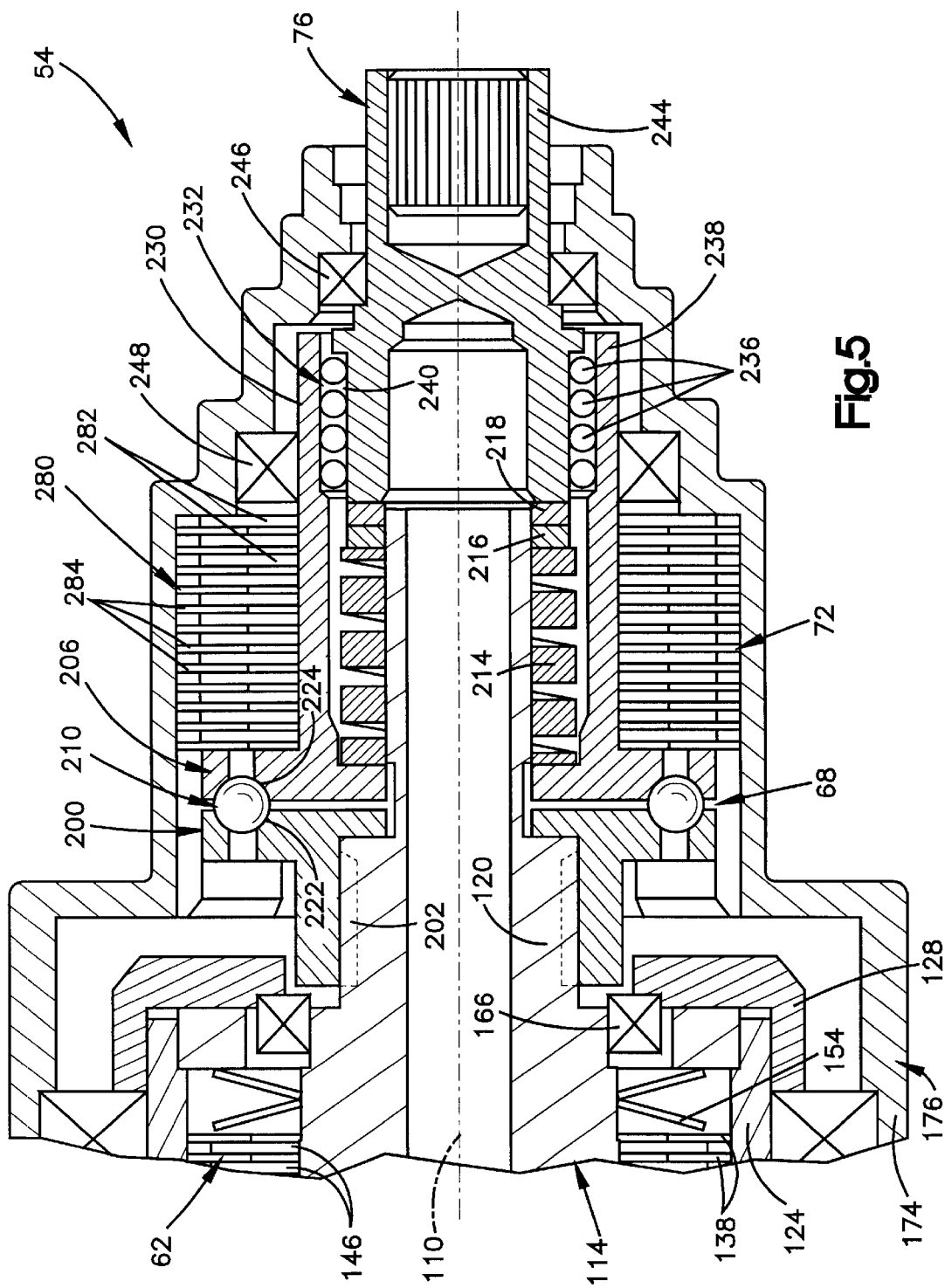
FIG. 5 is an enlarged fragmentary view of a portion of FIG. 3 and illustrating the construction of a torque limiting brake assembly and a brake actuator assembly which form part of the transmission assembly of FIG. 3.

The brake actuator assembly 68 includes an input member 200 (FIG. 5). The input member 200 has an annular configuration. The input member 200 is fixedly connected with the end portion 20 of intermediate the drive member 114 for rotation therewith about the axis 110. In the illustrated embodiment of the invention, a spline connection 202 is utilized to connect the input member 200 with the intermediate drive member 114. However, a different type of connection could be provided if desired.

In addition, the brake actuator assembly 68 includes an output member 206 (FIG. 5). The output member 206 is disposed in a coaxial relationship with the input member 200. The output member 206 is connected with the torque limiting brake assembly 72. When the torque limiting brake assembly 72 is in the disengaged condition, the output member 206 is freely rotatable relative to the housing 176.

However, when the torque limiting brake assembly 72 is in the engaged condition, the output member 206 is locked against rotation relative to the housing 176.

A plurality of force transmitting elements 210 are disposed in a circular array between the input member 200 and the output member 206. The force transmitting elements 210 are effective to transmit force between the input member 200 and output member 206 of the brake actuator assembly 68. The specific force transmitting elements 210 illustrated in FIG. 5 have a spherical configuration. However, the force transmitting elements 210 could have a different configuration if desired. For example, the force transmitting elements 210 could have a generally polygonal configuration. Alternatively, the force transmitting elements 210 could have a cylindrical configuration.

The input member 200 of the brake actuator assembly 68 is held against axial movement along the central axis 110 by the intermediate drive member 114. Thus, the bearings 164 and 166 (FIG. 4) rotatably support the intermediate drive member 114 and hold the intermediate drive member against axial movement along the axis 110. The input member 200 (FIG. 5) is fixedly secured to the end portion 120 of the intermediate drive member 114. Therefore, the intermediate drive member 114 is effective to hold the input member 200 against axial movement.

The output member 206 (FIG. 5) is movable through a relatively short distance along the axis 110. Axial movement of the output member 206 along the axis 110 effects operation of the toque limiting brake assembly 72 from the disengaged condition to the engaged condition. The force transmitting elements 210 cooperate with the input member 200 and output member 206 of the brake actuator assembly 68 to effect axial movement of the output member in response to the transmission of a predetermined level of torque through the brake actuator assembly 68.

A helical biasing spring 214 is effective to urge the output member 206 axially toward the left (as viewed in FIG. 5), that is, toward the input member 200. The biasing spring 214 is disposed on and extends around the end portion 120 of the intermediate drive member 114. A pair of nuts 216 and 218 engage an external thread convolution on the end portion 120 of the intermediate drive member 114. The nuts 216 and 218 resiliently compress the biasing spring 214 against the output member 206.

The output member 206 (FIG. 5) is urged toward the input member 200 with a predetermined preload force by the biasing spring 214. The preload force which the biasing spring 214 applies against the output member 206 is adjustable by adjusting the position of the nuts 216 and 218 relative to the end portion 120 of the intermediate drive member 114. In the illustrated embodiment of the invention, the biasing spring 214 is a helical coil spring. However, the biasing spring 214 could have a different construction if desired.

Each of the force transmitting elements 210 has a spherical configuration. Each of the force transmitting elements 210 is received in a conical recess 222 (FIG. 5) formed in the input member 200. In addition, each of the force transmitting elements 210 is received in a conical recess 224 in the output member 206. The conical recesses 222 and 224 in the input member 200 and output member 206 are disposed in axial alignment with each other during normal operation of the transmission assembly 54. This is because the biasing spring 214 firmly presses the recesses 224 in the output member 206 against the force transmitting elements 210. This results in the force transmitting elements 210 being pressed firmly into the recesses 222 in the input member 200.

During the transmission of torque loads which are less than a predetermined magnitude through the brake actuator assembly 68, the force transmitting elements 210 remain centered in the recesses 222 and 224 formed in the input and output members 200 and 206. However, when the torque load transmitted through brake actuator assembly 68 exceeds a predetermined value, the forces applied against the force transmitting elements 210 by the surfaces of the recesses 222 and 224 are effective to cause the force transmitting elements to move along the side surfaces of the recesses. As this occurs, an axial camming or wedging force is applied against the output member 206 to urge the output member 206 toward the right (as viewed in FIG. 5) against the influence of the biasing spring 214. Rightward (as viewed in FIG. 5) movement of the output member 206 results in the torque limiting brake assembly 72 being operated from the disengaged condition to the engaged condition.

When the torque limiting brake assembly 72 is to be operated from the engaged condition to the disengaged condition, the direction of operation of the motors 50 and 52 is reversed. When the torque applied to the input member 200 is reversed, the camming force applied against the output member 206 by the force transmitting elements 210 decreases. The biasing spring 214 is then effective to move the output member 206 toward the left (as viewed in FIG. 5). As this occurs, the force transmitting elements 210 are again centered in the recesses 222 and 224 in the input member 200 and output member 206. As the force transmitting elements 210 are centered in the recesses 222 and 224, the biasing spring 214 is effective to move the output member 206 toward the left (as viewed in FIG. 5). This leftward movement of the output member 206 results in the torque limiting brake assembly 72 being operated from the engaged condition to the disengaged condition.

When the torque limiting brake assembly 72 is in the disengaged condition, torque is transmitted from the output member 206 of the brake actuator assembly 68 to a transmission output member 76. The transmission output member 76 is rotatable with the output member 206 of the brake actuator assembly 68 about the axis 110. The transmission output member 76 is telescopically received in a cylindrical tubular section 230 of the torque limiting brake assembly output member 206. The transmission output member 76 is connected with the tubular section 230 by a coupling assembly 232.

The coupling assembly 232 (FIG. 5) allows the tubular section 230 of the output member 206 to move along the axis 110 relative to the housing 176 and transmission output member 76. However, the coupling assembly 232 interconnects the output member 206 of the brake actuator assembly 68 and the transmission output member 76 so that the two output members rotate together about the axis 110 during the transmission of torque with the torque limiting brake assembly 72 in the disengaged condition.

The illustrated embodiment of the coupling assembly 232 includes a plurality of force transmitting elements 236 having a spherical configuration. Each of the force transmitting elements 236 is received in a linear groove 238 formed in the tubular section 230 of the output member 206 of the brake actuator assembly 68. In addition, each of the force transmitting elements 236 engages a linear groove 240 formed on the outside of the transmission output member 76. The linear grooves 238 and 240 have longitudinal axes which extend parallel to the axis 110.

It should be understood that there are a plurality of parallel linear grooves 238 and 240 formed at spaced apart locations in the tubular section 230 and transmission output member 76. A linear array of force transmitting elements 236 is disposed in each of the grooves. Although one specific type of coupling assembly 232 has been illustrated to accommodate axial movement of the transmission output member 76 relative to the brake actuator assembly 68, other known types of coupling assemblies could be utilized if desired.

The transmission output member 76 has an internally splined end portion 244 which is connected with the shaft assembly 44 (FIGS. 1 and 2). The transmission output member 76 is supported for rotation relative to the housing 176 (FIG. 5) by a bearing assembly 246. The bearing assembly 246 retains the transmission output member 76 against axial movement relative to the housing 176. The tubular section 230 of the brake actuator assembly output member 206 is supported for rotation by a bearing assembly 248 which is disposed in a coaxial relationship with the bearing assembly 246. The bearing assembly 248 allows the output member 206 to move along the axis 110 relative to the housing 176 and transmission output member 76.

During the transmission of normal torque loads from the motors 50 and 52 (FIG. 2) through the transmission assembly 54 to the drive mechanisms 38 and 40 to the control surfaces 30 and 32, the torque limiting brake assembly 72 remains in the disengaged condition. When the torque limiting brake assembly 72 is disengaged, the input member 200 (FIG. 5) and output member 206 of the brake actuator assembly 68 are freely rotatable with the transmission output member 76 relative to the housing 176. Therefore, torque is transmitted through the shaft assembly 44 to the drive mechanism 40 for the control surface 32.

As the brake actuator assembly input and output members 200 and 206 rotate about the axis 110 with the torque limiting brake assembly 72 in a disengaged condition, the force transmitting elements 210 remain centered in the recesses 222 and 224 and rotate with the input and output members 200 and 206. At this time, the biasing spring 214 applies an axial force against the output member 206 of the brake actuator assembly 68. This axial force is sufficient to maintain the conical recesses 222 and 224 in the output member 206 and input member 200 in axial alignment with each other.

When the torque load transmitted through the brake actuator assembly 68 exceeds a predetermined magnitude, for example, 300 Newton meters, a camming action occurs between the force transmitting elements 210 (FIG. 5) and the conical surfaces of the recesses 222 and 224 in the input and output members 200 and 206. This camming action forces the output member 206 to move toward the right (as viewed in FIG. 5), away from the input member 200 along the axis 110. As this occurs, the torque limiting brake assembly 72 is operated from the disengaged condition to the engaged condition.

As the torque limiting brake assembly 72 is operated to the engaged condition, the brake actuator assembly output member 206 moves axially, toward the right (as viewed in FIG. 5), relative to the transmission output member 76. The axial movement of the brake actuator assembly output member 206 relative to the transmission output member 76 is accommodated by the coupling assembly 232.

When the torque limiting brake assembly 72 is operated to the engaged condition, the torque limiting brake assembly holds the output member 206 against rotation relative to the housing 176. The coupling assembly 232 blocks rotation of the transmission output member 76 relative to the brake actuator assembly output member 206. Therefore, rotation of the shaft assembly 44 connected with the transmission output member 76 is interrupted.

Torque Limiting Brake Assembly

The torque limiting brake assembly 72 includes a disc pack 280 (FIG. 5) which is connected with the output member 206 of the brake actuator assembly 68 and with the housing 176. The disc pack 280 includes a plurality of annular input friction discs 282 which are connected with the output member 206 for rotation therewith about the axis 110. In addition, the disc pack 280 includes a plurality of annular base friction discs 284 which are connected to the stationary housing 176. The friction discs 282 and 284 are interleaved and have flat radially extending major side surfaces which are disposed in abutting engagement.

The input friction discs 282 (FIG. 5) are held against rotation relative to the brake actuator assembly output member 206 by a plurality of splines formed on the tubular section 230. The splines on the tubular section 230 extend parallel to the axis 110 and are engaged by teeth which extend radially inward at central openings in the annular friction discs 282. The friction discs 282 are movable axially along the splines on the tubular section 230.

Similarly, the base friction discs 284 (FIG. 5) are held against rotation relative to the housing 176 by a plurality of splines formed on the inner side of the section 174 of the housing. The splines on the housing section 174 extend parallel to the axis 110 and are engaged by teeth which extend radially outward at the periphery of the annular friction discs 284. The friction discs 284 are movable axially along the splines on the housing section 174.

During normal operation of the transmission 54, the biasing spring 214 is effective to maintain the brake actuator assembly 68 in an unoperated condition. At this time, the brake actuator assembly 68 is ineffective to apply axial force against the disc pack 280 and the disc pack remains in a disengaged condition.

Upon the transmission of a predetermined torque through the brake actuator assembly 68, the force transmitting elements 210 apply a camming force against the side surfaces of the conical recesses 222 and 224. The camming force between the force transmitting elements 210 and the recesses 222 and 224 moves the brake actuator assembly output member 206 toward the right (as viewed in FIG. 5). This results in the application of an axial force against the disc pack 280.

The axial force applied against the disc pack 280 presses the flat annular side surfaces on the input and output friction discs 282 and 284 firmly against each other to prevent rotation of the brake actuator assembly output member 206 relative to the housing 176. As this occurs, the disc pack 280 is effective to hold both the output member 206 and the input member 200 of the brake actuator assembly 68 against rotation about the axis 110. This results in both the intermediate drive member 114 and transmission output member 76 being held against rotation relative to the housing 176.

The construction of only the brake actuator assembly 68 and torque limiting brake assembly 72 has been illustrated in FIG. 5. However, the brake actuator assembly 66 (FIG. 3) has the same construction and mode of operation as the brake actuator assembly 68. Similarly, the torque limiting brake assembly 70 has the same construction and mode of operation as the torque limiting brake assembly 72.

Operating Torque

The brake actuator assemblies 66 and 68 (FIG. 3) are constructed and adjusted so as to effect operation of the torque limiting brake assemblies 70 and 72 to the engaged condition in response to transmission of torque loads of the same magnitude. During normal operation of the drive apparatus 36 (FIG. 2), approximately equal torques are transmitted from the transmission assembly 54 to the shaft assemblies 42 and 44. Thus, both brake actuator assemblies 66 and 68 and both torque limiting brake assemblies 70 and 72 can normally be operated to transmit up to predetermined torque, for example 300 Newton meters, without engagement of either of the torque limiting brake assemblies.

Upon the occurrence of a malfunction in association with one of the control surfaces 30 or 32, the torque transmitted through the associated brake actuator assembly 66 or 68 increases to more than the predetermined torque. This results in the brake actuator assembly 66 or 68 associated with the malfunctioning control surface 30 or 32 effecting operation of one of the torque limiting brake assemblies 70 or 72 to the engaged condition. Since operation of either one of the torque limiting brake assemblies to the engaged condition interrupts rotation of the intermediate drive member 114, the brake actuator assembly associated with the control surface 30 or 32 which is not malfunctioning does not operate the associated torque limiting brake assembly to the actuated condition.

For example, if a malfunction occurs in association with the control surface 30 (FIG. 2), the torque transmitted through the shaft assembly 42 and brake actuator assembly 66 will increase. When this torque increases to a predetermined magnitude, for example 300 Newton meters, the brake actuator assembly 66 effects operation of the torque limiting brake assembly 70 to the engaged condition. Engagement of the torque limiting brake assembly 70 interrupts rotation of both the shaft assembly 42 (FIG. 2) and the intermediate drive member 114.

When the torque limiting brake assembly 70 operates to the engaged condition, the torque limiting brake assembly 72 remains in the disengaged condition. However, the transmission output member 76 and shaft assembly 44 stop rotating. This is because the intermediate drive member 114 stops rotating as soon as the torque limiting brake assembly 70 is engaged. Interrupting rotation of the intermediate drive member 114 interrupts the transmission of the torque to the brake actuator assembly 68. Therefore, operation of the torque limiting brake assembly 70 is effective to stop movement of both control surfaces 30 and 32 relative to the wings 24 and 26 of the aircraft 20.

The shock absorbing clutch assembly 62 begins to slip as increasing torque resulting from inertia of moving components of the motors 50 and 52 (FIG. 2) is transmitted to the shock absorbing clutch assembly. This slippage of the shock absorbing clutch assembly 62 is initiated immediately after the torque limiting brake assembly 70 is engaged. As this occurs, the intermediate drive member 114 is stationary and the torque limiting brake assembly 72 is disengaged.

In the examples previously set forth herein, the brake actuator assemblies 66 and 68 have operated to engage the associated torque limiting brake assemblies 70 and 72 in response to transmission of a specific predetermined torque, that is, 300 Newton meters. This torque is somewhat greater than the torque loads encountered during normal operation of the control surfaces 30 and 32. The shock absorbing clutch assembly 62 begins to slip at a predetermined torque, that is, 700 Newton meters, which is greater than the combined torque required to operate the control surfaces 30 and 32 under normal conditions.

It should be understood that the brake actuator assemblies 66 and 68 can be constructed to effect operation of the torque limiting brake assemblies 70 and 72 to the engaged condition in response to predetermined torques which are either greater than or less than the 300 Newton meter torque value set forth as an example.

Similarly, the shock absorbing clutch assembly 62 can be constructed so as to begin slipping at a predetermined torque which is either greater than or less than the 700 Newton meter torque value set forth as an example. If desired, the brake actuator assemblies 66 and 68 could be constructed so as to effect operation of the torque limiting brake assemblies 70 and 72 to the engaged condition at different torque values rather than the same torque values.

Drive Assembly-Second Embodiment

In the embodiment of the invention illustrated in FIGS. 1–5, torque from both of the motors 50 and 52 is transmitted through the single shock absorbing clutch assembly 62 in the transmission assembly 54. In the embodiment of the invention illustrated in FIGS. 6–9, a separate shock absorbing clutch assembly is provided for each of the motors. Since the embodiment of the invention illustrated in FIGS. 6–9 is generally similar to the embodiment of the invention illustrated in FIGS. 1–5, similar numerals will be utilized to designate similar components, the suffix letter "a" being added to the numerals of FIGS. 6–9 to avoid confusion.

A drive apparatus 36a (FIG. 6) is operable to effect movement of control surfaces 30a and 32a relative to wings of an aircraft in the same manner as previously disclosed in conjunction with the aircraft 20 of FIG. 1. The drive apparatus 36a (FIG. 6) includes a pair of reversible motors 50a and 52a which are connected with a transmission assembly 54a. The transmission assembly 54a is connected with drive mechanisms 38a and 40a for the control surfaces 30a and 32a through shaft assemblies 42a and 44a. Each of the shaft assemblies 42a and 44a may include either a single drive shaft or a plurality of drive shafts.

Figure 6:
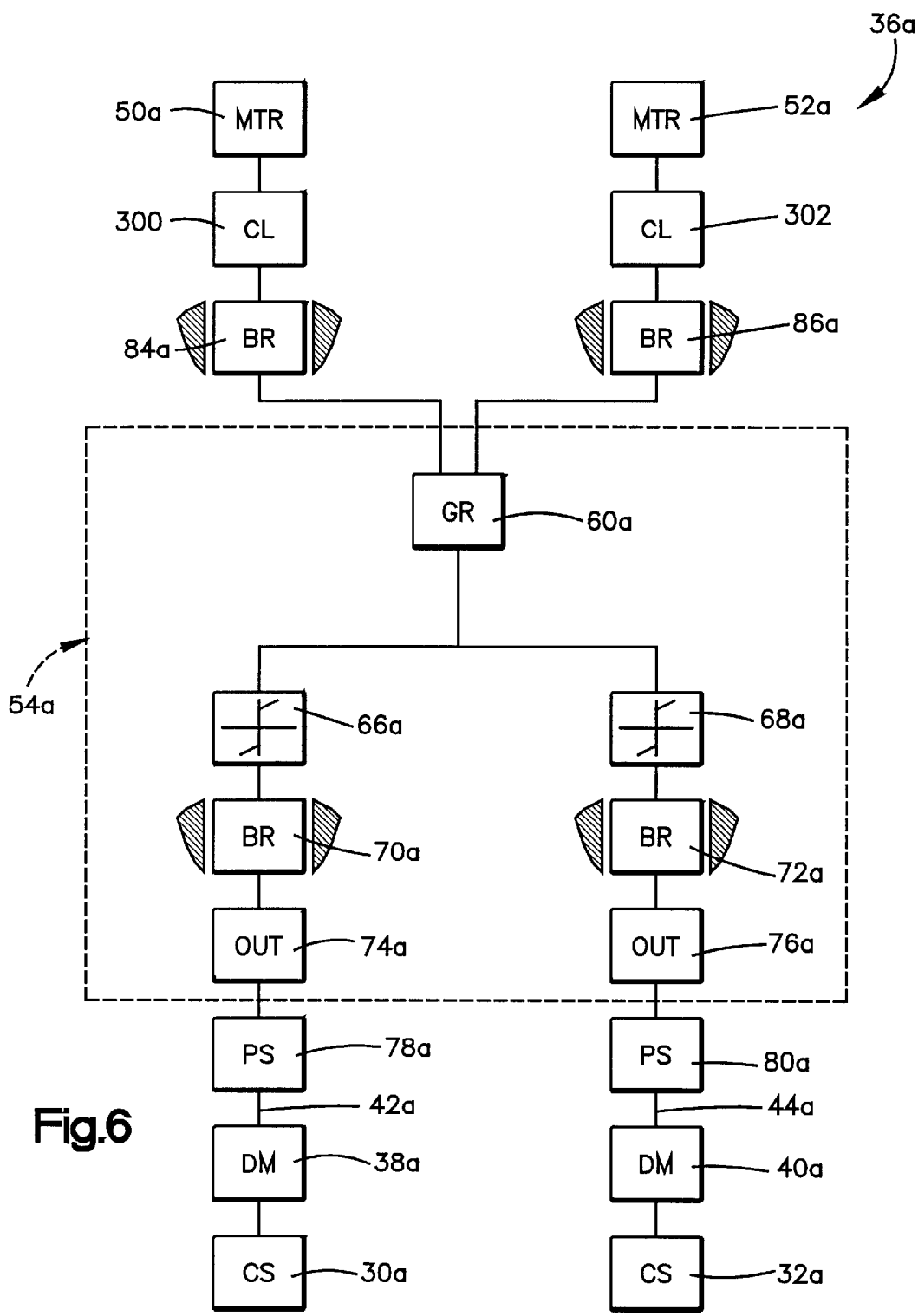
FIG. 6 is a schematic illustration, generally similar to FIG. 2, of a drive apparatus which forms a second embodiment of the invention.

Although only a pair of control surfaces 30a and 32a have been illustrated in FIG. 6 for association with a pair of wings of an aircraft, it is contemplated that a plurality of control surfaces could be provided for each of the wings of the aircraft. It should also be understood that although a pair of motors 50a and 52a have been provided in the drive apparatus 36a, a single motor could be utilized if desired. For example, the motor 52a could be eliminated.

The transmission assembly 54a of FIG. 6 includes a gear reduction assembly 60a. The output from the gear reduction assembly 60a is transmitted through a pair of brake actuator assemblies 66a and 68a to torque limiting brake assemblies 70a and 72a. When the torque limiting brake assemblies 70a and 72a are in a disengaged condition, the torque is transmitted through the brake assemblies to transmission output members 74a and 76a.

A pair of position sensors 78a and 80a sense the rotational positions of the shaft assemblies 42a and 44a. Output signals from the position sensors 78a and 80a are effective to indicate the rotational positions of the shaft assemblies 42a and 44a. Since the shaft assemblies 42a and 4a are connected with the control surfaces 30a and 32a through the drive mechanisms 38a and 40a, the output signals from the position sensors 78a and 80a are effective to indicate the positions of the control surfaces 30a and 32a.

The transmission assembly 54a of FIG. 6 has a construction which is generally similar to the construction of the transmission assembly 54 of FIGS. 2 and 3. However, the transmission assembly 54a does not include a shock absorbing clutch assembly corresponding to the shock absorbing clutch assembly 62 of the transmission assembly 54 of FIGS. 2 and 3. Thus, the brake actuator assemblies 66a and 68a, the torque limiting brake assemblies 70a and 72a, and the transmission output members 74a and 76a of FIG. 6 have the same general construction and mode of operation as the corresponding components of the transmission assembly 54 of FIGS. 2 and 3.

In accordance with a feature of this embodiment of the invention, one shock absorbing clutch assembly 300 (FIG. 6) is provided between the motor 50a and the transmission assembly 54a. Similarly, a second shock absorbing clutch assembly 302 is provided between the motor 52a and the transmission assembly 54a. Motor brake assemblies 84a and 86a corresponding to the motor brake assemblies 84 and 86 of FIG. 2, are associated with the shock absorbing clutch assemblies 300 and 302.

When the control surfaces 30a and 32a (FIG. 6) are to be moved relative to the wings of an aircraft, the motors 50a and 52a are operated. Force is transmitted through the shock absorbing clutch assemblies 300 and 302 and the disengaged motor brakes 84a and 86a to the transmission assembly 54a. The torque is transmitted from the transmission assembly 54a through the shaft assemblies 42a and 44a to the drive mechanisms 38a and 40a for the control surfaces 30a and 32a. The torque transmitted from the shaft assemblies 42a and 44a to the drive mechanisms 38a and 40a effects operation of the drive mechanisms to move the control surfaces 30a and 32a relative to the wings of the aircraft. The output from the position sensors 78a and 80a is indicative of the positions of the control surfaces 30a and 32a relative to the wings of the aircraft.

In the unlikely event of a malfunctioning of a control surface drive mechanism 38a or 40a, the torque transmitted from the motors 50a and 52a through the transmission assembly 54a and shaft assemblies 42a and 44a increases. When the torque transmitted to the transmission assembly 54a exceeds a predetermined torque, one of the brake actuator assemblies 66a and 68a effects operation of one of the torque limiting brake assemblies 70a and 72a to an engaged condition. Operating a torque limiting brake assembly 70a or 72a to the engaged condition interrupts rotation of the shaft assemblies 42a and 44a.

Upon interruption of rotation of the shaft assemblies 42a and 44a, the motors 50a and 52a (FIG. 6) are still operating. Therefore, there is substantial kinetic energy stored in the moving components of the motors 50a and 52a. This kinetic energy is absorbed by the shock absorbing clutch assemblies 300 and 302. Thus, the kinetic energy stored in the motor 50a is dissipated by the shock absorbing clutch assembly 300 without subjecting the components of the drive apparatus 36a to excessive shock loading. Similarly, the kinetic energy stored in the components of the motor 52a is dissipated by the shock absorbing clutch assembly 302 without excessive shock loading of the components of the drive apparatus 36a.

The clutch actuator assemblies 66a and 68a effect operation of the torque limiting brake assemblies 70a and 72a from the disengaged condition to the engaged condition in response to transmission of a predetermined magnitude of torque through the brake actuator assemblies. In one specific embodiment of the invention, the brake actuator assemblies 66a and 68a were constructed so as to effect operation of one of the torque limiting brake assemblies 70a and 72a from the disengaged condition to the engaged condition in response to transmission of a torque of 300 Newton meters through the one of the two brake actuator assemblies.

The shock absorbing clutch assemblies 300 and 302 begin to slip when torque of a predetermined magnitude is transmitted through the shock absorbing clutch assemblies. The magnitude of the torque load at which the shock absorbing clutch assemblies 300 and 302 begin to slip is greater than the sum of the torques at which the brake actuator assemblies 66a and 68a effect operation of the torque limiting brake assemblies 70a and 72a from the disengaged condition to the engaged condition. In the previously mentioned specific embodiment of the drive apparatus 36a, the shock absorbing clutch assemblies 300 and 302 begin to slip upon transmission of a torque load of 700 Newton meters. It should be understood that the foregoing specific values of torques for effecting operation of the brake actuator assemblies 66a and 68a and slippage of the shock absorbing clutch assemblies 300 and 302 have been set forth herein for purposes of clarity of description.

Figure 7:
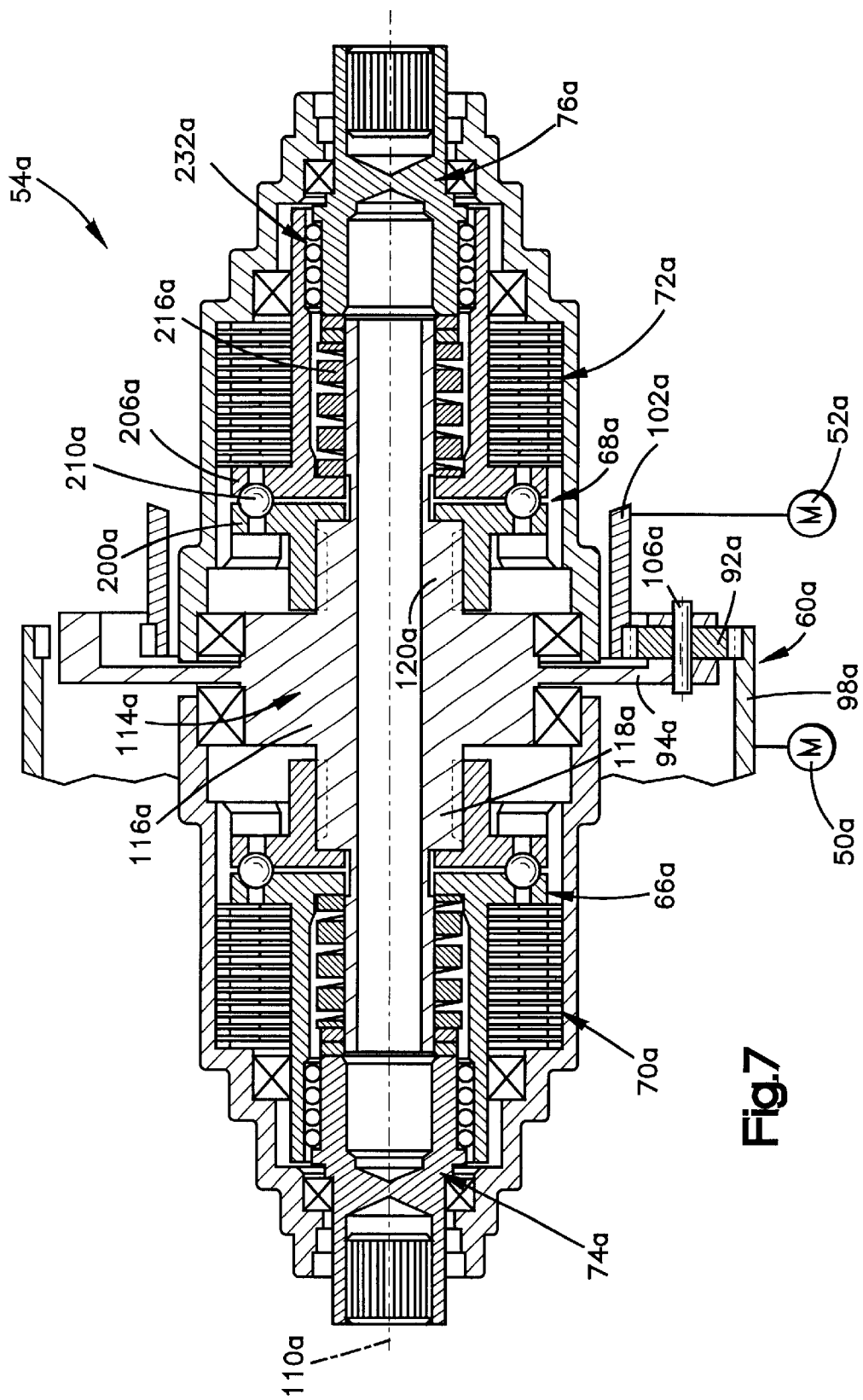
FIG. 7 is a schematic illustration of a transmission assembly containing components of the drive apparatus of FIG. 6.

It is contemplated that the transmission assembly 54a can and will be constructed so as to have the brake actuator assemblies 66a and 68a effect operation of the torque limiting brake assemblies 70a and 72a from the disengaged condition to the engaged condition in response to a torque which is either greater or less than 300 Newton meters. Similarly, it is contemplated that the shock absorbing clutch assemblies 300 and 302 will begin to slip in response to torque loads which either greater or less than 700 Newton meters. However, the torque load at which the shock absorbing clutch assemblies 300 and 302 begin to slip will be greater than the sum of the torques at which the brake actuator assemblies 66a and 68a effect operation of the torque limiting brake assemblies 70a and 72a to the engaged condition. Transmission Assembly Second Embodiment The transmission assembly 54a is illustrated in FIG. 7. The transmission assembly 54a includes the gear reduction assembly 60a, the brake actuator assemblies 66a and 68a, the torque limiting brake assemblies 70a and 72a and the transmission output members 74a and 76a. The construction of the transmission assembly 54a of FIG. 7 is simpler than the construction of the transmission assembly 54 of FIG. 3 since the transmission assembly 54a does not include a shock absorbing clutch assembly.

The gear reduction assembly 60a includes a planet gear 92a which is rotatably mounted on a planet carrier 94a by a mounting shaft 106a. A ring gear 98a and a sun gear 102a are disposed in meshing engagement with the planet gear 92a. The motor 50a is connected with the ring gear 98a and the motor 52a is connected with the sun gear 102a.

Upon operation of the motors 50a and 52a, the ring gear 98a is rotated in one direction about a longitudinal central axis 110a of the transmission assembly 54a while the sun gear 102a is rotated in the opposite direction about the axis 110a. Rotation of the ring and sun gears 98a and 102a in opposite directions effects rotation of the planet gear 92a about the mounting shaft 106a. In addition, the planet gear 92a revolves about the central axis 110a of the transmission 54a.

In the embodiment of the invention illustrated in FIG. 7, the planet carrier 94a is fixedly connected directly to the intermediate drive member 114a. Thus, the planet carrier 94a is integrally formed as one piece with a central portion 116a of the intermediate drive member 114a. Opposite end portions 118a and 120a of the intermediate drive member 114a are connected with the brake actuator assemblies 66a and 68a.

The brake actuator assemblies 66a and 68a have the same construction and mode of operation as the brake actuator assemblies 66 and 68 of FIGS. 3 and 5. The brake actuator assembly 68a includes an input member 200a which is fixedly connected with the intermediate drive member 114a for rotation therewith. In addition, the brake actuator assembly 68a includes an output member 206a which is connected with the torque limiting brake assembly 72a and the transmission output member 76a. A plurality of force transmitting elements 210a are disposed in recesses between the input member 200a and output member 206a.

A biasing spring 216a urges the output member 206a of the brake actuator assembly 68a toward the input member 200a of the brake actuator assembly 68a. The preload force applied by the biasing spring 216a to the output member 206a determines the torque load at which the brake actuator assembly 68a effects operation of the torque limiting brake assembly 72a from the disengaged condition to the engaged condition. The brake actuator assembly 66a and torque limiting brake assembly 70a have the same construction and mode of operation as the brake actuator assembly 68a and torque limiting brake assembly 72a.

The transmission output member 76a is connected with a shaft assembly, corresponding to the shaft assembly 44 of FIGS. 1 and 2. A coupling assembly 232a connects the output member 206a of the brake actuator assembly 68a with the transmission output member 76a. The coupling assembly 232a enables the brake actuator assembly output member 206a to move axially relative to the transmission output member 76a to effect operation of the torque limiting brake assembly 72a from the disengaged condition to the engaged condition.

In the event of a malfunctioning, such as a jamming, of either the control surface drive mechanism 40a or the control surface 32a, the torque transmitted through the brake actuator assembly 68a increases. When the torque transmitted through the brake actuator assembly 68a has increased to a predetermined magnitude, the force transmitting elements 210 (FIG. 7) are cammed out of the conical recesses in the input member 200a and output member 206a. This effects axial movement of the output member 206a along the central axis 110a of the transmission assembly 54a. Axial movement of the brake actuator assembly output member 206a is effective to operate the torque limiting brake assembly 72a to the engaged condition.

Upon engagement of the torque limiting brake assembly 72a, the end portion 120a of the intermediate drive member 114a is held against rotation about the axis 110a. When this occurs, both shaft assemblies 42a and 44a (FIG. 6) stop rotating. The torque limiting brake assembly 70a remains in a disengaged condition.

Motor Brake

Figure 8:
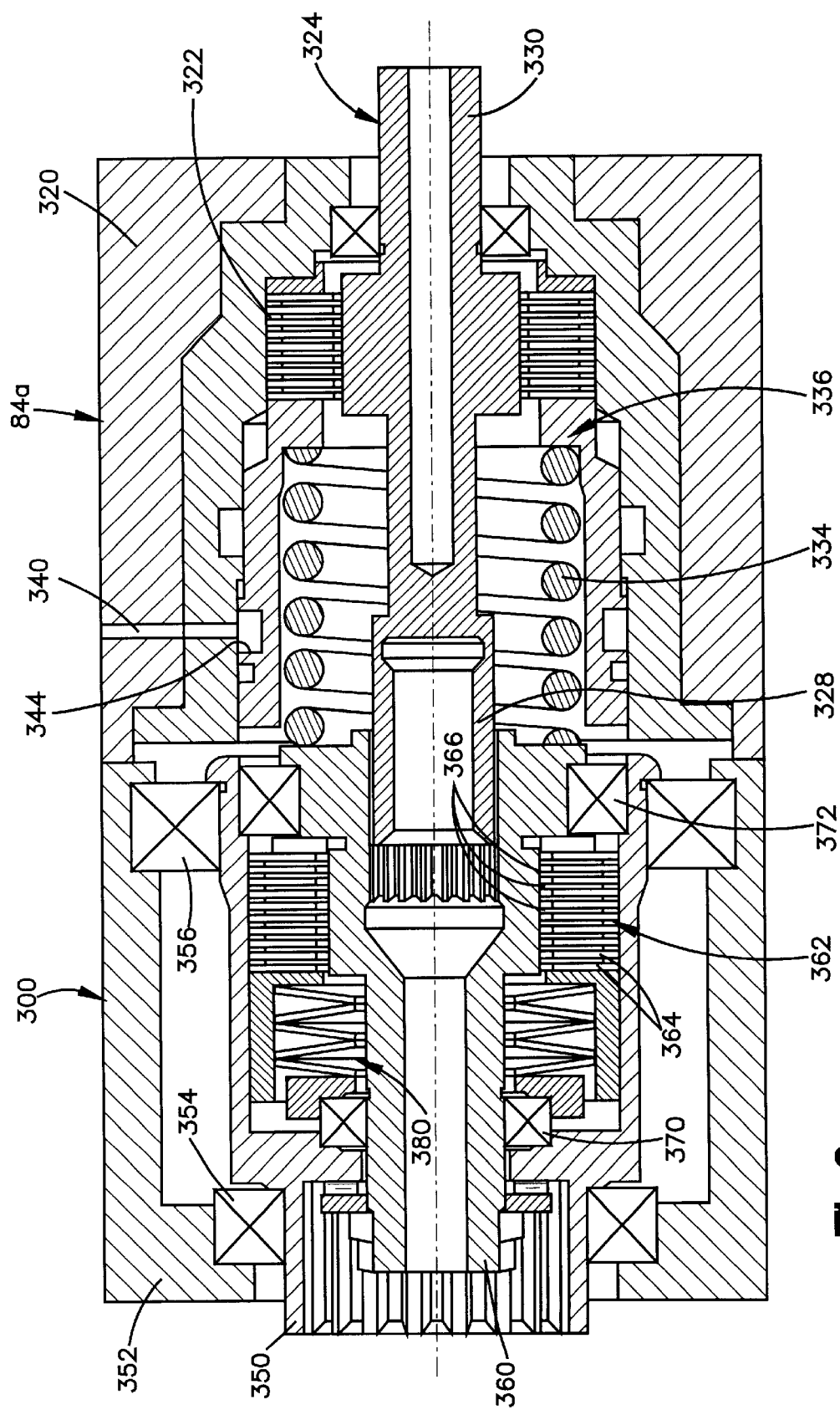
FIG. 8 is a schematic illustration of a shock absorbing clutch assembly and a motor brake assembly which form components of the embodiment of the drive apparatus of FIG. 6.

The motor brake 84a (FIG. 6) is effective to prevent movement of components of the motor 50a when the motor is in an inactive condition. The motor brake 84a is illustrated in FIG. 8 and includes a stationary housing 320 which is fixedly connected with the frame of the aircraft. A disc pack 322 is connected between a rotatable drive member 324 and the housing 320. The drive member 324 has an input end portion 328 which is connected with the motor 50a through the shock absorbing clutch assembly 300. The drive member 324 has an output end portion 330 which is connected with the ring gear 98a (FIG. 7) in the gear reduction assembly 60a.

A helical coil biasing spring 334 continuously urges a cylindrical actuator piston 336 toward the disc pack 322. When the motor 50a is in the inactive condition, the biasing spring 334 presses the actuator piston 336 against the disc pack 322 with sufficient force to enable the disc pack to hold the drive member 324 against rotation relative to the housing. Since the drive member 324 is directly connected with the movable components of the motor 50a, the movable components of the motor 50a are held against movement when the motor 50a is in an inactive condition.

In the illustrated embodiment of the invention, the motor 50a is a reversible hydraulic motor. When the motor 50a is to be operated, hydraulic fluid under pressure is conducted to the motor. This hydraulic fluid pressure is also conducted to an inlet passage 340 (FIG. 8) formed in the housing 320.

The hydraulic fluid pressure conducted to the inlet passage 340 is effective to apply force against an annular surface 344 on the actuator piston 336. The hydraulic fluid pressure forces the piston toward the left (as viewed in FIG. 8) against the influence of the biasing spring 334. As this occurs, the force applied against the disc pack 322 by the actuator piston 336 is reduced and the disc pack is operated to a disengaged condition. When the disc pack 322 is in the disengaged condition, the disc pack 322 is ineffective to retard rotation of the drive member 324.

During normal operation of the motor 50a, the disc pack 322 is in the disengaged condition. Thus, as soon as high pressure hydraulic fluid is conducted to the motor 50a to effect operation of the motor, the high pressure fluid is also conducted to the inlet passage 340 in the motor brake 84a. This results in the disc pack 322 being disengaged as soon as the motor 50a is activated.

The motor brake 86a has the same construction and mode of operation a s the motor brake 84a. When both motor brakes 84a and 86a are engaged, the components of the transmission assemblies are held stationary by the motor brakes. This maintains the control surfaces 30a and 32a stationary relative to the wings of the aircraft.

Shock Absorbing Clutch Assembly

The shock absorbing clutch assembly 300 (FIG. 8) includes a clutch input member 350 which is fixedly connected with the output shaft of the motor 50a (FIG. 6) for rotation therewith. The clutch input member 350 (FIG. 8) is rotatably supported on a housing 352 by bearings 354 and 356. The housing 352 is fixedly connected to the frame of the aircraft.

Force is transmitted from the clutch input member 350 to a clutch output drive member 360 through an annular disc pack 362. The disc pack 362 includes annular input friction discs 364 which are connected with the clutch input member 350 for rotation therewith. The disc pack 362 also includes annular output friction discs 366 which are connected with the clutch output drive member 360 for rotation therewith.

The clutch output drive member 360 is rotatably supported and held against axial movement by bearings 370 and 372. The input and output friction discs 364 and 366 in the disc pack 362 are pressed firmly against each other by a biasing spring 380. The biasing spring 380 is formed by a plurality of plain disc washers of the Belleville type. It should be understood that the biasing spring 380 could have a different construction if desired. For example, the biasing spring 380 could be a helical coil biasing spring.

The biasing spring 380 is effective to apply a force against the disc pack 362 so that the disc pack can transmit a predetermined torque without slipping. The predetermined torque at which the disc pack 362 begins to slip is greater than the sum of the predetermined torques at which the torque limiting brake assemblies 70a and 72a (FIG. 7) begin to slip. In the specific embodiment of the invention illustrated in FIGS. 7 and 8, the torque limiting brake assemblies 70a and 72a begin to slip when a torque of 300 Newton meters is transmitted through the torque limiting brake assemblies. The disc pack 362 begins to slip when a torque of 700 Newton meters is transmitted through the disc pack 362.

The construction of the shock absorbing clutch assembly 302 (FIG. 6) is the same as the construction of the shock absorbing clutch assembly 300. In addition, the construction of the motor brake 86a is the same as the construction of the motor brake 84a.

Operation

When the drive apparatus 36a (FIG. 6) is to be utilized to move the control surfaces 30a and 32a relative to the wings of an aircraft, similar to the aircraft 20 of FIG. 1, high pressure hydraulic fluid is conducted to the motors 50a and 52a. This high pressure hydraulic fluid is also conducted to the motor brakes 84a and 86a. The pressure conducted to the motor brake 84a operates the brake to a disengaged condition by applying force against the surface 344 on the actuator piston 336. The hydraulic fluid force moves the actuator piston toward the left (as viewed in FIG. 8). This disengages the disc pack 322 so that the drive member 324 is freely rotatable relative to the housing 320.

The motor brake 386 has the same construction and mode of operation as the motor brake 84. Therefore, when the motors 50a and 52a are to be operated, both motor brakes 84a and 86a are simultaneously operated to the 15 disengaged condition. It should be understood that the motors 50a and 52a could be electrical motors rather than hydraulic motors. If the motors 50a and 52a were electrical motors, the motor brakes 84a and 86a would be operated to a disengaged condition in response to the conduction of electrical energy to the motors 50a and 52a.

After the motor brakes 84a and 86a have been operated to the disengaged condition, the motors 50a and 52a are operated to transmit drive force to the shock absorbing clutch assemblies 300 and 302. The drive force transmitted from the motor 50a is applied to the clutch input member 350 (FIG. 8) of the shock absorbing clutch assembly 300. This torque rotates the clutch input member relative to the housing 352.

Assuming normal operation of the drive apparatus 36a, the friction disc pack 362 is effective to transmit the torque from the clutch input member 350 to the clutch output drive member 360. The clutch output drive member 360 telescopically receives the input end portion 328 of the motor brake drive member 324. A spline connection between the clutch output drive member 360 and the motor brake drive member 324 results in the motor brake drive member being rotated relative to the housing 320. The torque is transmitted from the motor brake drive member 324 to the ring gear 98a (FIG. 7) in the gear reduction assembly 60a.

Simultaneously with the transmission of torque from the motor 50a to the gear reduction unit 60a in the manner previously explained, torque is transmitted from the motor 52a to the gear reduction assembly 60a. The torque from the motor 52a is transmitted to the gear reduction assembly 60a through the shock absorbing clutch assembly 302 and motor brake 86a. The torque transmitted from the motor 52a to the gear reduction assembly 60a is applied to the sun gear 102a. The torque from the motor 50a is effective to rotate the ring gear 98a in one direction while the torque transmitted from the motor 52a is effective to rotate the sun gear in the opposite direction. This results in the planet gear 92a and planet carrier 94a rotating together about the central axis 110a of the transmission assembly 54a (FIG. 7).

Torque is transmitted from the gear reduction assembly 60a to the intermediate drive member 114a. At this time, the torque limiting brake assemblies 70a and 72a are in a disengaged condition and the torque is transmitted through the brake actuator assemblies 66a and 68a to the transmission output members 74a and 76a. The torque from the transmission output members 74a and 76a is transmitted through the shaft assemblies 42a and 44a (FIG. 6) to the control surface drive mechanisms 38a and 40a. The control surface drive mechanisms 38a and 40a are effective to move the control surfaces 30a and 32a relative to the wings of the aircraft. As this occurs, the positions sensors 78a and 80a indicate the positions of the control surfaces 30a and 32a relative to the wings of the aircraft.

In the unlikely event of a malfunctioning of one of the control surfaces and/or its associated drive mechanism, the increased torque results in one of the torque limiting brake assemblies 70a or 72a being operated to the engaged condition by its associated brake actuator assembly 66a or 68a. For example, if the control surface 30a and/or drive mechanism 38a becomes jammed, the torque transmitted through the shaft assembly 42a increases. This increased torque is transmitted through the force transmitting elements 210a in the brake actuator assembly 68a. As this occurs, the force transmitting elements 210a apply camming force against the surfaces of conical recesses in which the force transmitting elements 210a are disposed. This force causes the output member 206a of the brake actuator assembly 68a to move toward the right (as viewed in FIG. 7) to operate the torque limiting brake assembly 72a to the engaged condition. This results in the intermediate drive member 114a being held against rotation.

The resulting increase in torque is transmitted to the gear reduction assembly 60a. The increased torque is transmitted from the gear reduction assembly 60a through the motor brakes 84a and 86a to the shock absorbing clutch assemblies 300 and 302. When the torque transmitted through the shock absorbing clutch assemblies 300 and 302 is greater than the sum of the maximum torque which can be transmitted through the torque limiting brake assemblies 70a and 72a, the shock absorbing clutch assemblies 300 and 302 begin to slip and absorb the kinetic energy of the motors 50a and 52a and other components of the drive apparatus 36a.

CONCLUSION

In view of the foregoing description, it is apparent that the present invention provides a new and improved drive apparatus 36 which is operable to move a first control surface 30 on a first wing 24 of an aircraft 20 and a second control surface 32 on a second wing 26 of the aircraft. The drive apparatus 36 may be connected to the control surfaces 30 and 32 by shaft assemblies 42 and 44. The drive apparatus 36 is operable to interrupt rotation of the shaft assemblies 42 and 44 in response to the transmission of torque of a predetermined magnitude.

When the drive apparatus 36 interrupts rotation of drive shafts 42 and 44, the drive apparatus is effective to absorb the kinetic energy in order to limit shock loading on the components of the drive apparatus. The drive apparatus 36 may include a first brake assembly 70 which is connected with a control surface 30 on one wing of the aircraft 20. In the event of a malfunctioning of the control surface 30, such as a jamming of the control surface or a drive mechanism connected directly to the control surface, the first brake assembly 70 is operable to an engaged condition to prevent rotation of a drive shaft 42 connected with the first control surface 30.

Similarly, the drive apparatus 36 may include a second brake assembly 72 which is connected with a control surface 32 on a second wing 26 of the aircraft 20. In the event of a malfunctioning of the control surface 32 on the second wing 26 of the aircraft 20, the second brake assembly 72 is operable to an engaged condition to prevent rotation of a drive shaft 44 connected with the second control surface.

One or more shock absorbing assemblies 62, 300 or 302 may be provided to absorb kinetic energy of components of the drive apparatus 36 upon engagement of the brake assemblies 70 and 72 to interrupt rotation of the control surface drive shafts 42 and 44. The shock absorbing assemblies 62, 300, or 302 slip when a predetermined torque is transmitted. The predetermined torque at which a shock absorbing assembly 62, 300 or 302 begins to slip is at least as great as the sum of the torques required to effect operation of the torque limiting brake assemblies 70 and 72 to their engaged condition.

Having described the invention, the following is claimed:

1. A drive apparatus operable to move a first control surface on a first wing of an aircraft and a second control surface on a second wing of the aircraft, said drive apparatus comprising first and second motors, a first output drive member which is rotatable and is connected with the first control surface on the first wing of the aircraft, a second output drive member which is rotatable and is connected with the second control surface on the second wing of the aircraft, a first brake assembly connected with said first output drive member, said first brake assembly being operable between an engaged condition and a disengaged condition, said first brake assembly being effective to prevent rotation of said first output drive member and movement of the first control surface on the first wing of the aircraft when said first brake assembly is in the engaged condition, said first brake assembly being ineffective to prevent rotation of said first output drive member and movement of the first control surface on the first wing of the aircraft when said first brake assembly is in the disengaged condition, a second brake assembly connected with said second output drive member, said second brake assembly being operable between an engaged condition and a disengaged condition, said second brake assembly being effective to prevent rotation of said second output drive member and movement of the second control surface on the second wing of the aircraft when said second brake assembly is in the engaged condition, said second brake assembly being ineffective to prevent rotation of said second output drive member and movement of the second control surface on the second wing of the aircraft when said second brake assembly is in the disengaged condition, a first actuator assembly connected with said first brake assembly and through which torque is transmitted to said first output drive member to rotate said first output drive member and move the first control surface on the first wing of the aircraft when said first brake assembly is in the disengaged condition, said first actuator assembly being operable to effect operation of said first brake assembly from the disengaged condition to the engaged condition in response to transmission of a first torque through said first actuator assembly to said first output member, a second actuator assembly connected with said second brake assembly and through which torque is transmitted to said second output drive member to rotate said second output drive member and move the second control surface on the second wing of the aircraft when said second brake assembly is in the disengaged condition, said second actuator assembly being operable to effect operation of said second brake assembly from the disengaged condition to the engaged condition in response to transmission of a second torque through said second actuator assembly to said second output drive member, and a force transmission assembly connected with said first and second motors and said first and second actuator assemblies, said force transmission assembly being operable to transmit torque from said first and second motors to said first and second actuator assemblies during operation of said first and second motors to effect movement of the first and second control surfaces on the first and second wings of the aircraft, said force transmission assembly being operable to transmit torque from said first motor to said first and second actuator assemblies during operation of said first motor with said second motor in a nonoperating condition, said force transmission assembly being operable to transmit torque from said second motor to said first and second actuator assemblies during operation of said second motor with said first motor in a nonoperating condition.

2. An apparatus as set forth in claim 1 wherein said force transmission assembly includes at least one clutch assembly which is connected with at least one of said first and second motors, said clutch assembly slips when a third torque is transmitted to said first and second actuator assemblies, said third torque being greater than the sum of said first and second torques.

3. An apparatus as set forth in claim 1 wherein said force transmission assembly includes a first clutch assembly which is connected with said first motor and slips when a third torque is transmitted from said first motor to said first and second actuator assemblies and a second clutch assembly which is connected with said second motor and slips when a fourth torque is transmitted from said second motor to said first and second actuator assemblies.

4. An apparatus as set forth in claim 1 wherein said force transmission assembly includes an intermediate drive member which is rotatable under the influence of force transmitted from said first and second motors and is connected with said first and second actuator assemblies, said first actuator assembly being operable to effect operation of said first brake assembly from the disengaged condition to the engaged condition in response to transmission of the first torque through said first actuator assembly to said first output drive member during rotation of said intermediate drive member in a first direction, said second actuator assembly being operable to effect operation of said second brake assembly from the disengaged condition to the engaged condition in response to transmission of the second torque through said second actuator assembly to said second output drive member during rotation of said intermediate drive member in the first direction, said first actuator assembly being operable to effect operation of said first brake assembly from the engaged condition to the disengaged condition in response to rotation of said intermediate drive member in a second direction which is opposite to said first direction, said second actuator assembly being operable to effect operation of said second brake assembly from the engaged condition to the disengaged condition in response to rotation of said intermediate drive member in the second direction.

5. An apparatus as set forth in claim 4 wherein said force transmission assembly includes a planet gear which is connected with said intermediate drive member and is rotatable about an axis which revolves around a central axis of said intermediate drive member, a sun gear which is disposed in meshing engagement with said planet gear and is rotatable about the central axis of said intermediate drive member under the influence of force transmitted from said first motor, and a ring gear which is disposed in meshing engagement with said planet gear and is rotatable about the central axis of said intermediate drive member under the influence of force transmitted from said second motor.

6. An apparatus as set forth in claim 5 wherein said force transmission assembly further includes a clutch assembly connected with said intermediate drive member and said plant gear, said clutch assembly being effective to transmit torque from said planet gear to said intermediate drive member as said plant gear revolves around the central axis of said intermediate drive member, said clutch assembly includes first and second clutch members which are stationary relative to each other when less than a predetermined torque is being transmitted from said planet gear to said intermediate drive member, said first and second clutch members being movable relative to each other to limit the magnitude of the torque transmitted from said planet gear to said intermediate drive member.

7. An apparatus as set forth in claim 5 wherein said force transmission assembly further includes a planet gear support member which is fixedly connected with said intermediate drive member, said planet gear support member being connected with said first and second actuator assemblies and is effective to transmit torque which is conducted from said planet gear to said first and second actuator assemblies.

8. An apparatus as set forth in claim 1 wherein said force transmission assembly includes an intermediate drive member which is rotatable about a first axis under the influence of force transmitted from said first and second motors, said first actuator assembly includes a first input member which is connected with said intermediate drive member and is rotatable about the first axis with said intermediate drive member, said first actuator assembly includes a first output member which is connected with said first brake assembly and is rotatable about the first axis with said first output drive member when said first brake assembly is in the disengaged condition, said second actuator assembly includes a second input member which is connected with said intermediate drive member and is rotatable about the first axis with said intermediate drive member, said second actuator assembly includes a second output member which is connected with said second brake assembly and is rotatable about the first axis with said second output drive member when said second brake assembly is in the disengaged condition.

9. An apparatus as set forth in claim 8 wherein said first actuator assembly includes a first plurality of force transmitting elements disposed between said first input member and said first output member to transmit force between said first input member and said first output member, said second actuator assembly includes a second plurality of force transmitting elements disposed between said second input member and said second output member to transmit force between said second input member and said second output member.

10. An apparatus as set forth in claim 8 wherein said first brake assembly includes a first rotatable series of discs connected with said first output member of said first actuator assembly and a first nonrotatable series of discs interleaved with said first rotatable series of discs, said first rotatable series of discs being rotatable about the first axis with said first output member of said first actuator assembly, said second brake assembly includes a second rotatable series of discs connected with said second output member of said second actuator assembly and a second nonrotatable series of discs interleaved with said second rotatable series of discs, said second rotatable series of discs being rotatable together about the first axis with said second output member of said second actuator assembly.

11. An apparatus as set forth in claim 1 wherein said force transmission assembly includes an intermediate drive member rotatable about a first axis under the influence of force transmitted from said first and second motors, said first actuator assembly includes a first actuator input member which is connected with said intermediate drive member, a first actuator output member which is connected with said first output drive member, a first plurality of force transmitting elements disposed between said first actuator input member and said first actuator output member, and a first actuator biasing spring which provides force which presses said first actuator output member and said first actuator input member against said first plurality of force transmitting elements, said second actuator assembly includes a second actuator input member which is connected with said intermediate drive member, a second actuator output member which is connected with said second output drive member, a second plurality of force transmitting elements disposed between said second actuator input member and said second actuator output member, and a second actuator biasing spring which provides force which presses said second actuator output member and said second actuator input member against said second plurality of force transmitting elements.

12. An apparatus as set forth in claim 1 further including a first position sensor connected with said first output drive member and operable to provide an output signal indicative of a position of the first control surface relative to the first wing of the aircraft and a second position sensor connected with said second output drive member and operable to provide an output signal indicative of a position of the second control surface relative to the second wing of the aircraft.

13. A drive apparatus operable to move a first control surface on a first wing of an aircraft and a second control surface on a second wing of the aircraft, said drive apparatus comprising firs t and second motors, an intermediate drive member which is rotatable about a central axis of said intermediate drive member under the influence of force transmitted from said first and second motors, said intermediate drive member having a first end portion connected with the first control surface on the first wing of the aircraft and a second end portion connected with the second control surface on the second wing of the aircraft, a clutch assembly having a first friction surface connected with said intermediate drive member and rotatable with said intermediate drive member about the central axis of said intermediate drive member, a second friction surface disposed in engagement with said first friction surface, a force input member connected with said second friction surface, said force input member and second friction surface being rotatable together about the central axis of said intermediate drive member, a planet gear connected with said force input member and rotatable relative to said force input member about a planet gear rotation axis which is offset from the central axis of said intermediate drive member, said plant gear being rotatable with said force input member about the central axis of said intermediate drive member, a sun gear disposed in meshing engagement with said planet gear and connected with said first motor, said sun gear being rotatable about the central axis of said intermediate drive member under the influence of force transmitted from said first motor during operation of said first motor, and a ring gear disposed in meshing engagement with said planet gear and connected with said second motor, said ring gear being rotatable about the central axis of said intermediate drive member under the influence of force transmitted from said second motor during operation of said second motor, said first and second friction surfaces being stationary relative to each other during operation of said first and second motors and said force transmission assembly to move the first and second control surfaces relative to the first and second wings of the aircraft, said first and second friction surfaces being movable relative to each other to absorb energy upon the occurrence of a malfunction during operation of said first and second motors and said force transmission assembly to move the first and second control surfaces relative to the first and second wings of the aircraft.

14. An apparatus as set forth in claim 13 wherein said first friction surface is disposed on a first disc connected with said intermediate drive member for rotation therewith and said second friction surface is disposed on a second disc connected with said force input member for rotation therewith.

15. An apparatus as set forth in claim 13 further including a first brake assembly connected with said first end portion of said intermediate drive member, said first brake assembly being operable between an engaged condition in which said first brake assembly is effective to prevent rotation of said intermediate drive member and a disengaged condition in which said first brake assembly is ineffective to prevent rotation of said intermediate drive member, and a second brake assembly connected with said second end portion of said intermediate drive member, said second brake assembly being operable between an engaged condition in which said second brake assembly is effective to prevent rotation of said intermediate drive member and a disengaged condition in which said second brake assembly is ineffective to prevent rotation of said intermediate drive member.

16. A drive apparatus operable to move a first control surface on a first wing of an aircraft and a second control surface on a second wing of an aircraft, said drive apparatus comprising first and second motors, an intermediate drive member which is rotatable about a central axis of said intermediate drive member under the influence of force transmitted from said first and second motors, said intermediate drive member having a central portion disposed between first and second end portions of said intermediate drive member, said first end portion of said intermediate drive member being connected with the first control surface, said second end portion of said intermediate drive member being connected with the second control surface, a planet gear connected with said central portion of said intermediate drive member, said planet gear being rotatable relative to said intermediate drive member about a planet gear rotation axis which is offset from the central axis of said intermediate drive member, said planet gear being rotatable with said intermediate drive member about the central axis of said intermediate drive member, a sun gear disposed in meshing engagement with said planet gear and connected with said first motor, said sun gear being rotatable about the central axis of said intermediate drive member under the influence of force transmitted from said first motor during operation of said first motor, a ring gear disposed in meshing engagement with said planet gear and connected with said second motor, said ring gear being rotatable about the central axis of said intermediate drive member under the influence of force transmitted from said second motor during operation of said second motor, a first brake assembly connected with said first end portion of said intermediate drive member, said first brake assembly being operable between an engaged condition and a disengaged condition, said first brake assembly being effective to prevent rotation of said first end portion of said intermediate drive member about the central axis of said intermediate drive member and movement of the first control surface relative to the first wing of the aircraft when said first brake assembly is in the engaged condition, said first brake assembly being ineffective to prevent rotation of said first end portion of said intermediate drive member about the central axis of said intermediate drive member and movement of said first control surface relative to the first wing of the aircraft when said first brake assembly is in the disengaged condition, and a second brake assembly connected with said second end portion of said intermediate drive member, said second brake assembly being operable between an engaged condition and a disengaged condition, said second brake assembly being effective to prevent rotation of said second end portion of said intermediate drive member about the central axis of said intermediate drive member and movement of the second control surface relative to the second wing of the aircraft when said second brake assembly is in the engaged condition, said second brake assembly being ineffective to prevent rotation of said second end portion of said intermediate drive member about the central axis of said intermediate drive member and movement of the second control surface relative to the second wing of the aircraft when said second brake assembly is in the disengaged condition.

17. An apparatus as set forth in claim 16 further including a housing which encloses said first and second brake assemblies, said central portion of said intermediate drive member extends through an opening in said housing, said planet gear being rotatably mounted on said central portion of said intermediate drive member at a location outside of said housing.

18. An apparatus as set forth in claim 16 further including a clutch assembly connected with said central portion of said intermediate drive member and said planet gear to enable said planet gear to rotate relative to the central portion of said intermediate drive member about the central axis of said intermediate drive member upon transmission of force of a predetermined magnitude between said planet gear and said intermediate drive member.

19. A drive apparatus operable to move a first control surface on a first wing of an aircraft and a second control surface on a second wing of the aircraft, said drive apparatus comprising a first drive shaft which is rotatable and is connected with the first control surface on the first wing of the aircraft, a second drive shaft which is rotatable and is connected with the second control surface on the second wing of the aircraft, a first brake assembly connected with said first drive shaft, said first brake assembly being operable to an engaged condition in which said first brake assembly is effective to prevent rotation of said first drive shaft in response to transmission of a first torque through said first drive shaft, a second brake assembly connected with said second drive shaft, said second brake assembly being operable to an engaged condition in which said second brake assembly is effective to prevent rotation of said second drive shaft in response to transmission of a second torque through said second drive shaft, a motor, and a clutch assembly connected with said motor and with said first and second drive shafts, said clutch assembly being effective to transmit at least a third torque between said motor and said first and second drive shafts without slippage, said clutch assembly begins to slip upon transmittal through said clutch assembly of a torque which is greater than the third torque, said third torque being at least as great as the sum of said first and second torques.

20. An apparatus as set forth in claim 19 further including a first position sensor connected with said first drive shaft to indicate the rotational position of said first drive shaft and a second position sensor connected with said second drive shaft to indicate the rotational position of said second drive shaft.

21. An apparatus as set forth in claim 19 further including an intermediate drive member, said intermediate drive member having a first end portion connected with said first drive shaft and a second end portion connected with said second drive shaft, said intermediate drive member has a central portion which is connected with said clutch assembly.

22. An apparatus as set forth in claim 19 further including a first actuator assembly through which torque is transmitted between said clutch assembly and said first drive shaft, said first actuator assembly being operable to effect operation of said first brake assembly from the disengaged condition to the engaged condition in response to the transmission of the first torque through said first actuator assembly, and a second actuator assembly through which torque is transmitted between said clutch assembly and said second drive shaft, said second actuator assembly being operable to effect operation of said second brake assembly from the disengaged condition to the engaged condition in response to the transmission of the second torque through said second actuator assembly.

23. An apparatus as set forth in claim 19 wherein said clutch assembly includes a first series of friction discs connected with an input drive member which is connected with said motor and is rotatable under the influence of force transmitted from said motor during operation of said motor and a second series of friction discs connected with an output drive member which is connected with said first and second drive shafts, said first series of friction discs being interleaved with and disposed in a side-by-side relationship with said second series of friction discs.

24. A drive apparatus operable to move a first control surface on a first wing of an aircraft and a second control surface on a second wing of an aircraft, said drive apparatus comprising a first brake assembly connected with the first control surface on the first wing of the aircraft, said first brake assembly being operable between an engaged condition in which said first brake assembly is effective to limit torque transmitted to the first control surface and a disengaged condition in which said first brake assembly is ineffective to limit torque transmitted to the first control surface, a first actuator assembly connected with said first brake assembly and operable to effect operation of said first brake assembly from the disengaged condition to the engaged condition in response to transmission of torque of a predetermined magnitude to the first control surface, a second brake assembly connected with the second control surface on the second wing of the aircraft, said second brake assembly being operable between an engaged condition in which said second brake assembly is effective to limit torque transmitted to said second control surface and a disengaged condition in which said second brake assembly is ineffective to limit torque transmitted to the second control surface, a second actuator assembly connected with said second brake assembly and operable to effect operation of said second brake assembly from the disengaged condition to the engaged condition in response to transmission of torque of a predetermined magnitude to the second control surface, and a housing enclosing said first and second brake assemblies and said first and second actuator assemblies.

25. An apparatus as set forth in claim 24 wherein said first brake assembly includes a first disc pack and said second brake assembly includes a second disc pack disposed in a coaxial relationship with said first disc pack.

26. An apparatus as set forth in claim 24 further including means for absorbing kinetic energy upon operation of either of said first and second brake assemblies to the engaged condition.

27. A drive apparatus to move a first control surface on a first wing of an aircraft and a second control surface on a second wing of the aircraft, said drive apparatus comprising first and second motors, a first clutch assembly connected with said first motor, said first clutch assembly slips to absorb energy when a torque greater than a first torque is transmitted between said first clutch assembly and said first motor, a second clutch assembly connected with said second motor, said second clutch assembly slips to absorb energy when a torque greater than a second torque is transmitted between said second clutch assembly and said second motor, a gear assembly connected with said first and second clutch assemblies and driven by torque transmitted through said first and second clutch assemblies, a first output member connected with said gear assembly and rotated by torque transmitted through said gear assembly, a first shaft connected with said first output member and with the first control surface on the first wing of the aircraft, said first shaft being rotatable under the influence of torque transmitted from said first output member to effect movement of the first control surface relative to the first wing of the aircraft, a second output member connected with said gear assembly and rotated by torque transmitted through said gear assembly, a second shaft connected with said second output member and with the second control surface on the second wing of the aircraft, said second shaft being rotatable under the influence of torque transmitted from said second output member to effect movement of the second control surface relative to the second wing of the aircraft.

28. An apparatus as set forth in claim 27 wherein said gear assembly includes a planet gear connected with said first and second output members, a sun gear disposed in meshing engagement with said planet gear and connected with said first clutch assembly, said sun gear being rotatable about a first axis under the influence of force transmitted from said first motor through said first clutch assembly to said sun gear, a ring gear disposed in meshing engagement with said planet gear and connected with said second clutch assembly, said ring gear being rotatable about the first axis under the influence of force transmitted from said second motor through said second clutch assembly to said ring gear.

29. An apparatus as set forth in claim 27 further including a first brake assembly connected with said first output member, said first brake assembly being effective to prevent rotation of said first output member and movement of the first control surface on the first wing of the aircraft when said first brake assembly is in an engaged condition, said first brake assembly being ineffective to prevent rotation of said first output member and movement of the first control surface on the first wing of the aircraft when said first brake assembly is in the disengaged condition, a second brake assembly connected with said second output member, said second brake assembly being effective to prevent rotation of said second output member and movement of the second control surface on the second wing of the aircraft when said second brake assembly is in the engaged condition, said second brake assembly being ineffective to prevent rotation of said second output member and movement of the second control surface on the second wing of the aircraft when said second brake assembly is in the disengaged condition, a first actuator assembly connected with said first brake assembly, said first actuator assembly being operable to effect operation of said first brake assembly between the engaged and disengaged conditions, and a second actuator assembly connected with said second brake assembly said second actuator assembly being operable to effect operation of said second brake assembly between the engaged and disengaged conditions.

30. An apparatus to move a first control surface on a first wing of an aircraft and a second control surface on a second wing of the aircraft, said drive apparatus comprising first and second motors, a gear assembly connected with said first and second motors and driven by force transmitted from said first and second motors, a first output member connected with said gear assembly and rotated by torque transmitted through said gear assembly, a first shaft connected with said first output member and the first control surface on the first wing of the aircraft, said first shaft being rotatable under the influence of torque transmitted from said first output member to effect movement of the first control surface relative to the first wing of the aircraft, a second shaft connected with said second output member and the second control surface on the second wing of the aircraft, said second shaft being rotatable under the influence of torque transmitted from said second output member to effect movement of the second control surface relative to the second wing of the aircraft, a first brake assembly connected with said first output member, said first brake assembly being effective to prevent rotation of said first output member and movement of the first control surface on the first wing of the aircraft when said first brake assembly is in an engaged condition, said first brake assembly being ineffective to prevent rotation of said first output member and movement of the first control surface on the first wing of the aircraft when said first brake assembly is in a disengaged condition, and a second brake assembly connected with said second output member, said second brake assembly being effective to prevent rotation of said second output member and movement of the second control surface on the second wing of the aircraft when said second brake assembly is in an engaged condition, said second brake assembly being ineffective to prevent rotation of said second output member and movement of the second control surface on the second wing of the aircraft when said second brake assembly is in a disengaged condition.

31. An apparatus as set forth in claim 30 further including a first actuator assembly connected with said first brake assembly, said first actuator assembly being operable to effect operation of said first brake assembly between the engaged and disengaged condition, and a second actuator assembly connected with said second brake assembly, said second actuator assembly being operable to effect operation of said second brake assembly between the engaged and disengaged conditions.

32. An apparatus as set forth in claim 31 wherein said gear assembly includes a planet gear connected with said first and second output members, a sun gear disposed in meshing engagement with said planet gear and connected with said first motor, said sun gear being rotatable about a first axis under the influence of force transmitted from said first motor to said sun gear, a ring gear disposed in meshing engagement with said planet gear and connected with said second motor, said ring gear being rotatable about the first axis under the influence of force transmitted from said second motor to said ring gear.

* * * * *

UNITED STATES PATENT AND TRADEMARK OFFICE
CERTIFICATE OF CORRECTION

PATENT NO. : 6,419,606 B1
DATED : July 16, 2002
INVENTOR(S) : Alfred K. Tengan et al.

It is certified that error appears in the above-identified patent and that said Letters Patent is hereby corrected as shown below:

<u>Column 25,</u>
Line 4, before "gear" change "plant" to -- planet --.
Line 6, after "said" change "plant" to -- planet --.

<u>Column 26,</u>
Line 53, after "said" change "plant" to -- planet --.

Signed and Sealed this

Eighth Day of April, 2003

JAMES E. ROGAN
*Director of the United States Patent and Trademark Office*